(12) United States Patent
Hamdan et al.

(10) Patent No.: US 12,368,732 B2
(45) Date of Patent: Jul. 22, 2025

(54) EVENT-TRIGGERING CONTROL SCHEME FOR DISCRETE TIME CYBERPHYSICAL SYSTEMS IN THE PRESENCE OF SIMULTANEOUS HYBRID STOCHASTIC ATTACKS

(71) Applicant: KING FAHD UNIVERSITY OF PETROLEUM AND MINERALS, Dhahran (SA)

(72) Inventors: Mutaz M. Hamdan, Dhahran (SA); Magdi S. Mahmoud, Dhahran (SA); Uthman Baroudi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 294 days.

(21) Appl. No.: 18/181,999

(22) Filed: Mar. 10, 2023

(65) Prior Publication Data

US 2023/0291753 A1   Sep. 14, 2023

Related U.S. Application Data

(60) Provisional application No. 63/318,838, filed on Mar. 11, 2022.

(51) Int. Cl.
*H04L 9/40* (2022.01)
(52) U.S. Cl.
CPC ...... *H04L 63/1416* (2013.01); *H04L 63/1425* (2013.01); *H04L 63/1458* (2013.01)
(58) Field of Classification Search
CPC ............. H04L 63/1416; H04L 63/1425; H04L 63/1441; H04L 63/1458
See application file for complete search history.

(56) References Cited

U.S. PATENT DOCUMENTS 11,159,540 B2 * 10/2021 Abbaszadeh ....... H04L 63/1416
11,425,163 B2 *  8/2022 Mahmoud .......... H04L 63/1466
(Continued)

FOREIGN PATENT DOCUMENTS

AU   2021105857 A4 * 11/2021
CN     108629132 A  * 10/2018 ......... G06F 17/5009

OTHER PUBLICATIONS

Magdi S. Mahmoud, et al., "Secure control of cyber physical systems subject to stochastic distributed DoS and deception attacks", International Journal of Systems Science, vol. 51, Issue 9, Jun. 1, 2020, pp. 1653-1668.

(Continued)

*Primary Examiner* — Mohamed A. Wasel
(74) *Attorney, Agent, or Firm* — Oblon, McClelland, Maier & Neustadt, L.L.P.

(57) ABSTRACT

A method and system to control a cyber physical system using an observer-based controller including a detector to determine an occurrence of an attack on the cyberphysical system and to inform the observer-based controller via a signal. The observer estimates a system state of the cyberphysical system based on at least partial information about the cyber physical system. The observer-based controller is configured with a predetermined observer gain and controller gain. The observer-based controller is configured to control the cyberphysical system using an estimated error determination that is altered depending on a type of cyber attack. The observer-based controller is configured to control the cyberphysical system subjected to cyber attacks in both a forward channel connecting at least one sensor with the observer and a backward channel connecting the observer-based controller with actuators.

11 Claims, 27 Drawing Sheets

(56) References Cited

U.S. PATENT DOCUMENTS

| | | | |
|---|---|---|---|
| 11,595,413 B2* | 2/2023 | Ting | G06N 20/00 |
| 11,868,479 B2* | 1/2024 | Lysecky | G06F 21/566 |
| 2016/0117158 A1* | 4/2016 | MacCleery | G06F 30/00 |
| | | | 717/174 |
| 2018/0255091 A1 | 9/2018 | Mestha et al. | |
| 2018/0316701 A1* | 11/2018 | Holzhauer | H04L 63/1433 |
| 2019/0068626 A1* | 2/2019 | Compton | H04L 63/1416 |
| 2019/0228110 A1* | 7/2019 | Yan | G06N 3/047 |
| 2019/0253440 A1 | 8/2019 | Mathur et al. | |
| 2019/0354087 A1* | 11/2019 | Gupta | G05B 19/4155 |
| 2021/0089661 A1* | 3/2021 | Rieger | G06F 11/0736 |
| 2021/0243224 A1 | 8/2021 | Mahmoud et al. | |
| 2022/0210200 A1* | 6/2022 | Crabtree | G06F 16/951 |

OTHER PUBLICATIONS

Jie Cao, et al., "Hybrid-triggered-based security controller design for networked control system under multiple cyber attacks", Information Sciences, vol. 548, 2021, pp. 69-84.

* cited by examiner

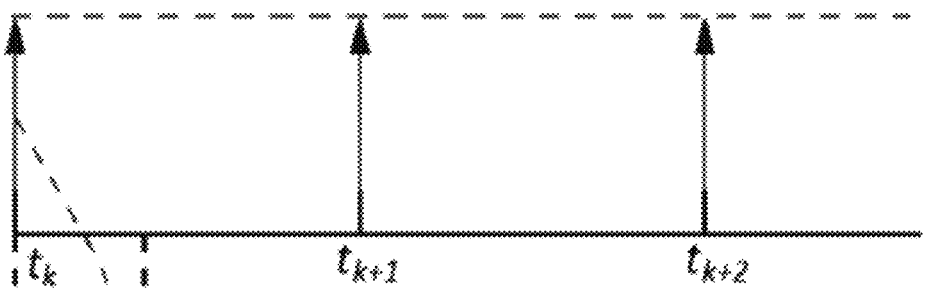
FIG. 4A
(a) Nominal signal
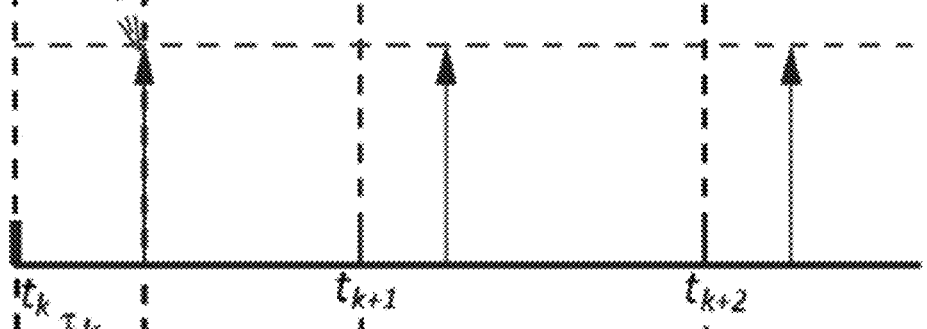
FIG. 4B
(b) Presence of DoS attack
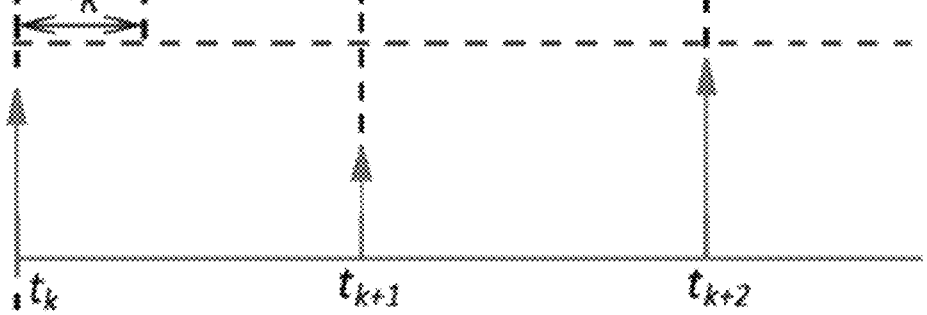
FIG. 4C
(c) Presence of deception attack
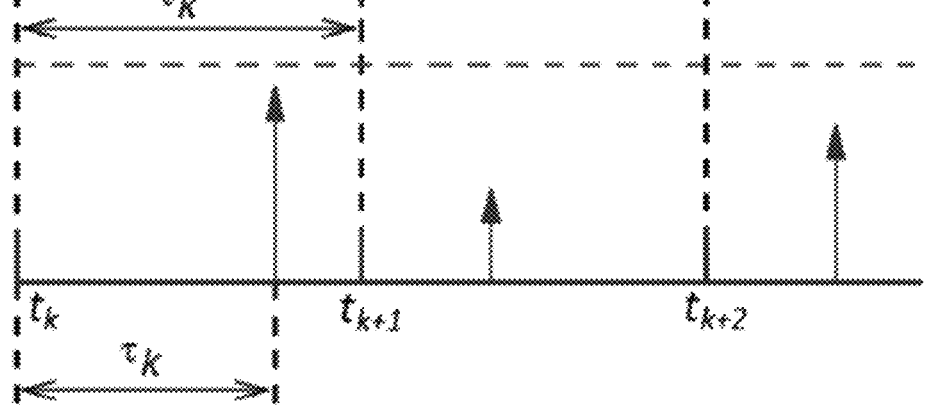
FIG. 4D
(d) Presence of simultaneous attacks
FIG. 4

EVENT-TRIGGERING CONTROL SCHEME FOR DISCRETE TIME CYBERPHYSICAL SYSTEMS IN THE PRESENCE OF SIMULTANEOUS HYBRID STOCHASTIC ATTACKS

CROSS-REFERENCE TO RELATED APPLICATIONS

This application claims the benefit of priority to provisional application no. 63/318,838 filed Mar. 11, 2022, the entire contents of which are incorporated herein by reference.

STATEMENT REGARDING PRIOR DISCLOSURE BY THE INVENTORS

Aspects of this technology are described in an article Hamdan, M. M., Mahmoud, M. S., & Baroudi, U. A. (2022), "Event-triggering control scheme for discrete time Cyberphysical Systems in the presence of simultaneous hybrid stochastic attacks," *ISA Transactions*, 122, 1-12 which is herein incorporated by reference in its entirety.

BACKGROUND

Technical Field

The present disclosure is directed generally to control of a cyberphysical system in the event of simultaneous hybrid cyber attacks, and, in particular, to methods, computer readable media, and systems for control of cyber physical systems subject to simultaneous hybrid distributed denial of service and deception attacks.

Description of Related Art

A Fourth Industrial Revolution, (referred to as Industry Revolution 4.0 or Industry 4.0), is a trend towards automation and data exchange in manufacturing technologies and processes. Industry Revolution 4.0 may be characterized by interconnection, information transparency, technical assistance, decentralized decisions. Interconnection is in the form of connection and communication between machines, devices, sensors, and people. Information transparency provides operators with comprehensive information to make decisions. Technical assistance assists humans in decision-making and problem-solving, and helping humans with difficult and unsafe tasks. Decentralized decisions make cyber physical systems able to make decisions on their own and to perform their tasks as autonomous as possible.

In industrial Revolution 4.0, an industrial control system is an electronic control system and associated instrumentation used for industrial process control. Control systems for industrial control receive data from remote sensors measuring process variables, compare the collected data with desired setpoints, and derive command functions that are used to control a process through actuators, such as control valves.

An industrial control system may be accessed from anywhere in the world through Internet access. FIG. 1 is a system diagram illustrating types of access available for a non-limiting example of an industrial control system. An industrial control system 130 is accessible through the Internet 110. Devices 112 can access the Internet through a router 102. The Internet 110 provides connection to a database system 120 for storing data related to industrial control systems. Visual interfaces may be provided in mobile devices 104 and 106 for control and monitoring of the industrial control system 130.

Industrial control systems are usually implemented by supervisory control and data acquisition (SCADA) systems, or distributed control systems (DCSs), and programmable logic controllers (PLCs). Such systems are used in industries such as chemical processing, pulp and paper manufacture, power generation, oil and gas processing, and telecommunications.

The SCADA is a control system architecture for high-level supervision of machines and processes. FIG. 2 is a system diagram of a non-limiting example of a SCADA system. The operator interfaces which enable monitoring and the issuing of process commands, like controller set point changes, are handled through the SCADA computer system 200. A high level interface can be provided in a user terminal 202. A database management system 204 maintains data and provides an interface for the SCADA system 200. The subordinated operations, e.g. the real-time control logic or controller calculations, are performed by networked modules 212 connected to the field sensors and actuators 222, 224, 226, 228. Distributed local interfaces 206 may be provided proximate to a local operation control group. The hierarchical control computers for the SCADA system may be interconnected over a communication connection 210.

FIG. 3 is a block diagram for an exemplary programmable logic controller. Although control operations may be performed using a programmable logic controller, other control computing devices may be used, including, but not limited to microcontrollers and other control circuitry. The programmable logic controller 300 can include a CPU 302, analog and/or digital input 314, one or more outputs 316, a power supply 322, and a communication device 324. The input 314 connects to various sensing devices 312. The outputs 316 connect to load devices 318, such as actuators. The programmable logic controller 300 may be programmed by way of a programming interface 332 and a memory device 334.

Cyberphysical Systems (CPSs) integrate computation, communication, and control to obtain a designed operation of a physical system. A lot of research has focused on CPS due to its wide range of applications. See Rajkumar R, Lee I, Sha L, Stankovic J. Cyber-physical systems: the next computing revolution. In: Design Automation Conference. IEEE; 2010, p. 731-6, incorporated herein by reference in its entirety. Some examples include smart grids, power allocation, advanced automotive systems, distribution networks of water and gas, chemical process control, management of emergency, and transportation networks. See Drayer E, Routtenberg T. Detection of false data injection attacks in smart grids based on graph signal processing. IEEE Syst J 2019; Zhao L, Li Y, Yuan Y, Yuan H. Optimal power allocation for multiple dos attackers in wireless networked control systems. ISA Trans 2019; Feng Y, Hu B, Hao H, Gao Y, Li Z, Tan J. Design of distributed cyber-physical systems for connected and automated vehicles with implementing methodologies. IEEE Trans Ind Inf 2018;14(9):4200-11; Kim K-D, Kumar P. An overview and some challenges in cyber-physical systems. J Indian Inst Sci 2013;93(3):341-52; and Wang K, Yuan L, Miyazaki T, Chen Y, Zhang Y. Jamming and eavesdropping defense in green cyber-physical transportation systems using a Stackelberg game. IEEE Trans Ind Inf 2018;14(9):4232-42, each incorporated herein by reference in their entirety.

CPSs are vulnerable to different types of cyber attacks while showing normal operation even when there is a failure in the physical part. As a result, control of CPS has added challenges due to the need to consider security problems. These different types of attacks could disrupt or cause irreparable damage to the physical parts. See Han S, Xie M, Chen H-H, Ling Y. Intrusion detection in cyber-physical systems: Techniques and challenges. IEEE Syst J 2014;8(4): 1052-62; and Muradore R, Quaglia D. Energy-efficient intrusion detection and mitigation for networked control systems security. IEEE Trans Ind Inf 2015;11(3):830-40, each incorporated herein by reference in their entirety. For example, inserting malware like viruses and worms by the attacker could rearrange the packets in medium access control layers. Also, an adversary can disturb the system dynamic or induces a perturbation when the security protection is weak. See Ding D, Han Q-L, Xiang Y, Ge X, Zhang X-M. A survey on security control and attack detection for industrial cyber-physical systems. Neurocomputing 2018;275:1674-83, incorporated herein by reference in its entirety. The breadth of the problem's impacts, methods, and motivations can be seen by several examples such as: The Aurora vulnerability in 2007, the Turkish pipeline attack in 2008, and Iranian Uranium attack, Stuxnet in 2010, and the Ukrainian power grid attack in 2015. See Angle M G, Madnick S, Kirtley J L, Khan S. Identifying and anticipating cyberattacks that could cause physical damage to industrial control systems. IEEE Power Energy Technol Syst J 2019; 6(4):172-82, incorporated herein by reference in its entirety.

Regarding the 2008 Turkish pipeline attack, the Baku-Tbilisi-Ceyhan (BTC) pipeline was built to be one of the most secure in the world. Cyber security is provided by keeping operations communications separate from business and outside communications. Even so, the security measures were no match for the digital intruders who injected malicious software into the control network, allowing them to tamper with the system and cause an explosion. The explosion was the result of a hack on the computers managing the pipeline. Software planted in the pipeline system shut down alarms and raised the pressure in the pipeline to such a high level that it exploded.

Regarding the 2015 Ukrainian power grid attack, the power grid in two western oblasts of Ukraine was hacked, which resulted in substantial power outages for roughly 230,000 consumers in Ukraine for 1-6 hours. The cyberattack was complex and consisted of the following steps: Prior compromise of corporate networks using spear-phishing emails with BlackEnergy malware. Then control under the SCADA was seized, causing substations to be remotely switched off, IT infrastructure components (uninterruptible power supplies, modems, RTUs, commutators) were disabled, files stored on servers and workstations were destroyed with the KillDisk malware, a Denial-of-service attack was made on the call-center to deny consumers up-to-date information on the blackout, and emergency power at the utility company's operations center was switched off.

There are two main types of cyber-attacks when considering industrial control: 1) Denial of service (DoS) attacks, which are strategies that are normally applied to occupy the communication resources, and prevent a signals' transmission among the cyber parts. 2) Deception attack, which is the modification of the transmitted signals. See Mahmoud M S, Hamdan M M, Baroudi U A. Modeling and control of cyberphysical systems subject to cyber attacks: a survey of recent advances and challenges. Neurocomputing 2019;338: 101-15, incorporated herein by reference in its entirety.

The distributed DoS (DDoS) attack, which is also referred to as a coordinated attack, is the most dangerous type of cyber-attack. In this kind of attack, the DoS attack is organized using a large number of compromised machines. See Hoque N, Kashyap H, Bhattacharyya D. Real-time DDoS attack detection using FPGA. Comput Commun 2017;110:48-58, incorporated herein by reference in its entirety. Additionally, DDoS occurs more frequently since it is simple to create, costs less, and has a high impact on CPS including its ability of produce a complete disconnection in an organization. See Semerci M, Cemgil A T, Sankur B. An intelligent cyber security system against ddos attacks in sip networks. Comput Netw 2018;136:137-54; and Ali Y, Xia Y, Ma L, Hammad A. Secure design for cloud control system against distributed denial of service attack. Control Theory Technol 2018;16(1):14-24, each incorporated herein by reference in their entirety. For instance, this kind of attack could lead power grids to instability and create long delay jitter in the packets. See Srikantha P, Kundur D. Denial of service attacks and mitigation for stability in cyber-enabled power grid. In: 2015 IEEE Power & Energy Society Innovative Smart Grid Technologies Conference (ISGT). IEEE; 2015, p. 1-5; and Beitollahi H, Deconinck G. A dependable architecture to mitigate distributed denial of service attacks on network-based control systems. Int J Crit Infrastruct Prot 2011;4(3-4):107-23, each incorporated herein by reference in their entirety.

Many research articles discuss controlling of CPS in the presence of cyber-attacks. Most of the literature addresses one type of the attack. For example: Yuan et al. (2016), Dolk et al., Yang et al., Ge et al., and Wang et al. consider DoS attacks. See Yuan Y, Yuan H, Guo L, Yang H, Sun S. Resilient control of networked control system under DoS attacks: A unified game approach. IEEE Trans Ind Inf 2016;12(5):1786-94; Dolk V, Tesi P, De Persis C, Heemels W. Event-triggered control systems under denial-of-service attacks. IEEE Trans Control Netw Syst 2017;4(1):93-105; Yang C, Yang W, Shi H. Dos attack in centralised sensor network against state estimation. IET Control Theory Appl 2018;12(9):1244-53; Ge H, Yue D, Xie X, Dou C, Wang S. Security control of cyber-physical system based on switching approach for intermittent denial-of-service jamming attack. ISA Trans 2019; and Wang M, Liu Y, Xu B. Observer-based Hinfty control for cyber-physical systems encountering DoS jamming attacks: An attack-tolerant approach. ISA transactions 2020, each incorporated herein by reference in their entirety. And Amin et al., Bai et al., Ding et al, and Yuan et al. (2017) consider the deception attacks. See Amin S, Litrico X, Sastry S, Bayen AM. Cyber security of water SCADA systems Part I: Analysis and experimentation of stealthy deception attacks. IEEE Trans Control Syst Technol 2013;21(5):1963-70; Bai C Z, Pasqualetti F, Gupta V. Data-injection attacks in stochastic control systems: Detectability and performance tradeoffs. Automatica 2017;82:251-60; Ding D, Wei G, Zhang S, Liu Y, Alsaadi F E. On scheduling of deception attacks for discrete-time networked systems equipped with attack detectors. Neurocomputing 2017;219:99-106; and Yuan H, Xia Y. Secure filtering for stochastic non-linear systems under multiple missing measurements and deception attacks. IET Control Theory Appl 2017;12(4):515-23, each incorporated herein by reference in their entirety.

Some researchers have addressed two kinds of attacks. An event based secure control system is designed while considering DoS and deception attacks that occur randomly. See Ding D, Wang Z, Wei G, Alsaadi F E. Event-based security control for discrete-time stochastic systems. IET Control Theory Appl 2016;10(15):1808-15, incorporated herein by reference in its entirety. In Yuan et al. (2017), the optimal control problem is solved by implementing a delta operator method and an ϵ-Nash equilibrium is applied for a type of networked control systems (NCSs) in the presence of physical attacks in addition to DoS and deception attacks. See Yuan Y, Zhang P, Guo L, Yang H. Towards quantifying the impact of randomly occurred attacks on a class of networked control systems. J Franklin Inst B 2017;354(12):4966-88, incorporated herein by reference in its entirety.

One researcher, Liu et al., has considered the occurrence of three kinds of attacks in designing an H∞ filter for uncertain systems. The DoS attack is assumed to block communication. See Liu J, Yang M, Xie X, Peng C, Yan H. Finite-time H. filtering for state-dependent uncertain systems with event-triggered mechanism and multiple attacks. IEEE Trans Circuits Syst I Regul Pap 2019;67(3):1021-34, incorporated herein by reference in its entirety.

Cyberphysical systems apply heterogeneous forms of communications in the communication amongst all components. As an example, programmable logic controllers (PLCs) use Ethernet, Modbus, and Wifi communication. Moreover, similar devices could be connected by several proprietary protocols depending on the vendor. As a result, the vulnerability to an attack preferably should be prohibited while transmitting signals through the system to avoid a possible scenario of instability or undesired operations of the CPS. Subsequently, it is very crucial to consider the security problems in the design of the control part of the CPS. See Mahmoud M S, Hamdan M M. Improved control of cyberphysical systems subject to cyber and physical attacks. Cyber-Phys Syst 2019;1-18, incorporated herein by reference in its entirety.

In the models published in literature, the attacks are represented as random variables with constant values, a situation which does not exemplify several of the recent actual occurrences of incidents in practice. A more reliable approach is to design and implement the attack with conditional probabilities that are variable. Moreover, there remains a need to address the scenario of hybrid attacks which affect a system with DDoS and deception attacks simultaneously.

An attack modeled as a Bernoulli distribution has been used in several research articles such as Ding et al., Cárdenas et al., and Teixeira et al. See Ding et al. (2017); Amin S, Cárdenas A A, Sastry S S. Safe and secure networked control systems under denial-of-service attacks. In: International Workshop on Hybrid Systems: Computation and Control. Springer; 2009, p. 31-45; and Teixeira A, Pérez D, Sandberg H, Johansson K H. Attack models and scenarios for networked control systems, In: Proceedings of the 1st International Conference on High Confidence Networked Systems, 2012: p. 55-64, each incorporated herein by reference in their entirety.

A reason for using the Bernoulli distribution is due to the nature of attacks on a cyberphysical system. There are substantial differences between an attack on a cyber physical system and packet loss in a networked system. Typically, packet loss occurs in networked systems due to network congestion and/or channel impairments. On the other hand, when the cyberphysical system is under attack, packet loss may occur due to buffer overflow when the server is overwhelmed with requests that cannot be satisfied. In this later situation, the server may drop packets or send them after a long delay which make the packets useless.

In addition, the two types of packet losses are different in their nature and impact. The packet losses in the typical network are random, but the packet losses due to DDoS are not and instead in many cases are intelligent and stealthy. The differences in impact between the two types of packet losses require careful attention and treatment. See Zhang W, Branicky M S, Phillips S M. Stability of networked control systems. IEEE Control Syst Mag 2001;21(1):84-99; Schenato L, Sinopoli B, Franceschetti M, Poolla K, Sastry S S. Foundations of control and estimation over lossy networks. Proc IEEE 2007;95(1):163-87; and Schenato L. To zero or to hold control inputs with lossy links? IEEE Trans Automat Control 2009;54(5):1093-9, each incorporated herein by reference in their entirety.

An important characteristic of event-triggered control (ETC) is the reducing of the number of executions of control tasks. The number of control tasks is reduced because they are restricted to those that take place only when they are needed based on a certain condition and without affecting the required performance. So, ETC has been implemented widely in real time applications in the last decade. See Mahmoud M S, Xia Y. Chapter 2—networked control systems' fundamentals. In: Mahmoud M S, Xia Y, editors. Networked Control Systems. Butterworth-Heinemann; 2019, p. 37-89, incorporated herein by reference in its entirety.

Recently, event-based control methods were implemented to achieve the consensus of linear multi-agent systems (MASs) on directed graphs and undirected graph in the absence and presence of external disturbances based on relative information between neighboring agents only. See Li X, Sun Z, Tang Y, Karimi H. Adaptive event-triggered consensus of multi-agent systems on directed graphs. IEEE Trans Automat Control 2020; and Li X, Tang Y, Karimi H R. Consensus of multi-agent systems via fully distributed event-triggered control. Automatica 2020;116:108898, each incorporated herein by reference in their entirety. In Tang et al., distributed hybrid event-triggering strategies were presented for nonlinear MASs subjected to DoS attack. See Tang Y, Zhang D, Shi P, Zhang W, Qian F. Event-based formation control for multi-agent systems under dos attacks. IEEE Trans Automat Control 2020, incorporated herein by reference in its entirety.

Accordingly, it is one object of the present disclosure to provide a control scheme that can address simultaneous hybrid attacks in order to stabilize a cyber physical system while being attacked, for example, the Ukrainian power grid attack, as attack scenarios become more complex. A further object is to provide a control scheme for stabilizing a CPS that is subjected to hybrid simultaneous DDoS and deception attacks.

Some implementations of the present disclosure were conceived in light of the above-mentioned problems and limitations.

SUMMARY

An aspect is an observer-based controller to securely control a cyberphysical system. The observer-based controller can include a detector to determine an occurrence of an attack on the cyberphysical system and to inform the observer-based controller via a signal, wherein the detector is at least one of a communication detector, a control signal detector, and a fluid level detector; and an observer to estimate a system state of the cyberphysical system based on at least partial information about the cyber physical system. The observer-based controller is configured with a predetermined observer gain and controller gain. The observer-based controller is configured to control the cyberphysical system using an estimated error determination that is altered depending on a type of cyber attack. The observer-based controller is configured to control the cyberphysical system subjected to cyber attacks in both a forward channel connecting at least one sensor with the observer and a backward channel connecting the observer-based controller with actuators.

A further aspect is a method to control a cyber physical system, the method can include detecting, via a detector, an occurrence of an attack on and to inform an observer-based controller via a signal, wherein the detector is at least one of a communication detector, a control signal detector, and a fluid level detector; estimating, via an observer, a system state of the cyberphysical system based on at least partial information about the cyber physical system, wherein the observer-based controller is configured with a predetermined observer gain and a controller gain, and controlling, using the observer-based controller, the cyberphysical system using an estimated error determination that is altered depending on a type of cyber attack, wherein the cyberphysical system is controlled while being subjected to cyber attacks in both a forward channel connecting a at least one sensor with the observer and a backward channel connecting the controller with actuators.

A further aspect is a non-transitory computer readable medium having instructions stored therein that, when executed by one or more processors, cause the one or more processors to perform a method to control a cyberphysical system using an observer-based controller, the method can include detecting, via a detector, an occurrence of an attack on the cyberphysical system and to inform the observer-based controller via a signal, wherein the detector is at least one of a communication detector, a control signal detector, and a fluid level detector; estimating, via an observer, a system state of the cyberphysical system based on at least partial information about the cyber physical system, wherein the observer-based controller is configured with a predetermined observer gain and a controller gain, and controlling, using the observer-based controller, the cyberphysical system using an estimated error determination that is altered depending on a type of cyber attack, wherein the cyberphysical system is controlled while being subjected to cyber attacks in both a forward channel connecting at least one sensor with the observer and a backward channel connecting the observer-based controller with actuators.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 4A, 4B, 4C, 4D show the effects of the cyber attacks on a transmitted signal;

DETAILED DESCRIPTION

Figure 1:
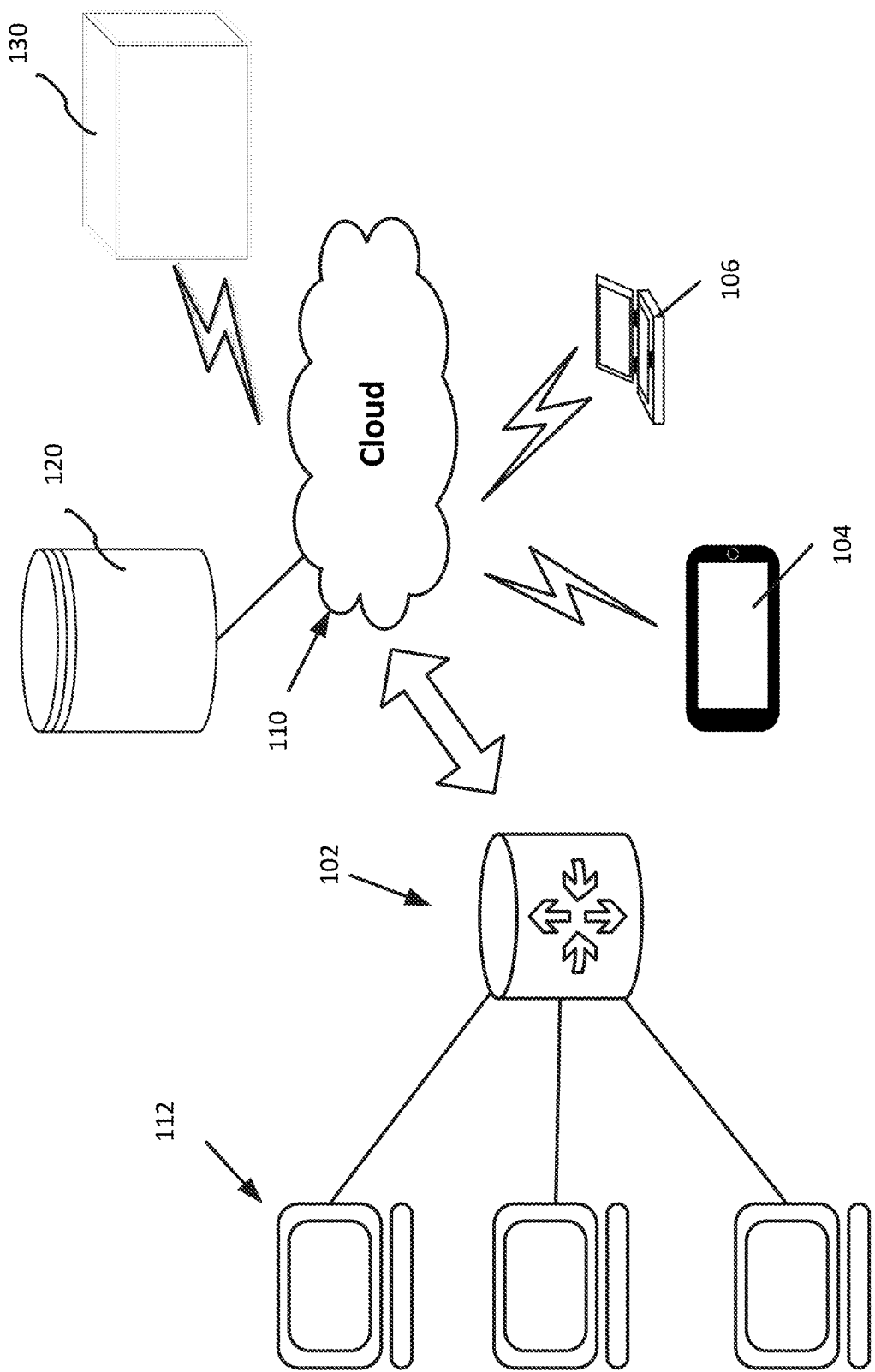
FIG. 1 is a system diagram illustrating types of access available for a non-limiting example of an industrial control system.
Figure 2:
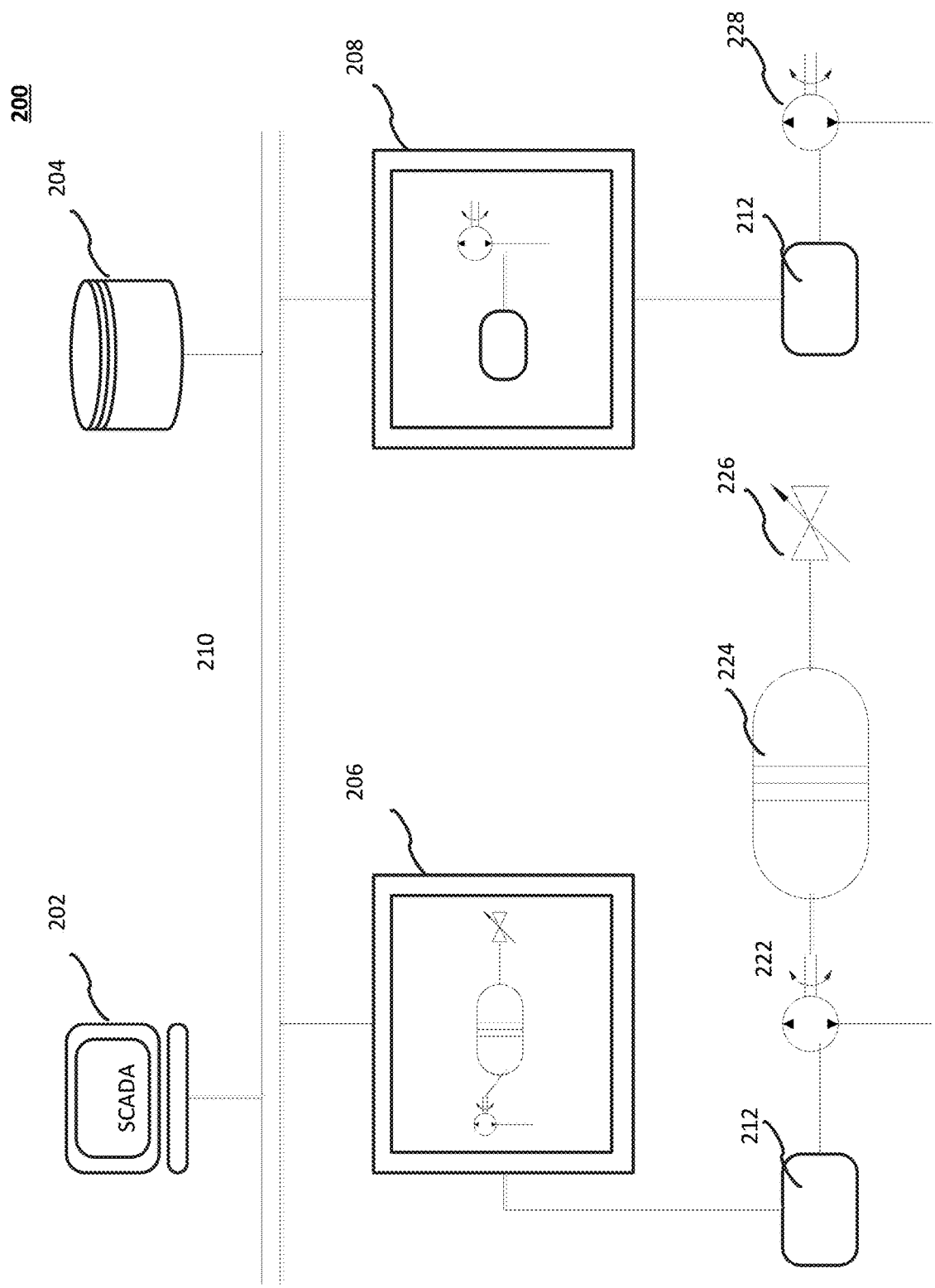
FIG. 2 is a system diagram of a non-limiting example of a SCADA system.
Figure 3:
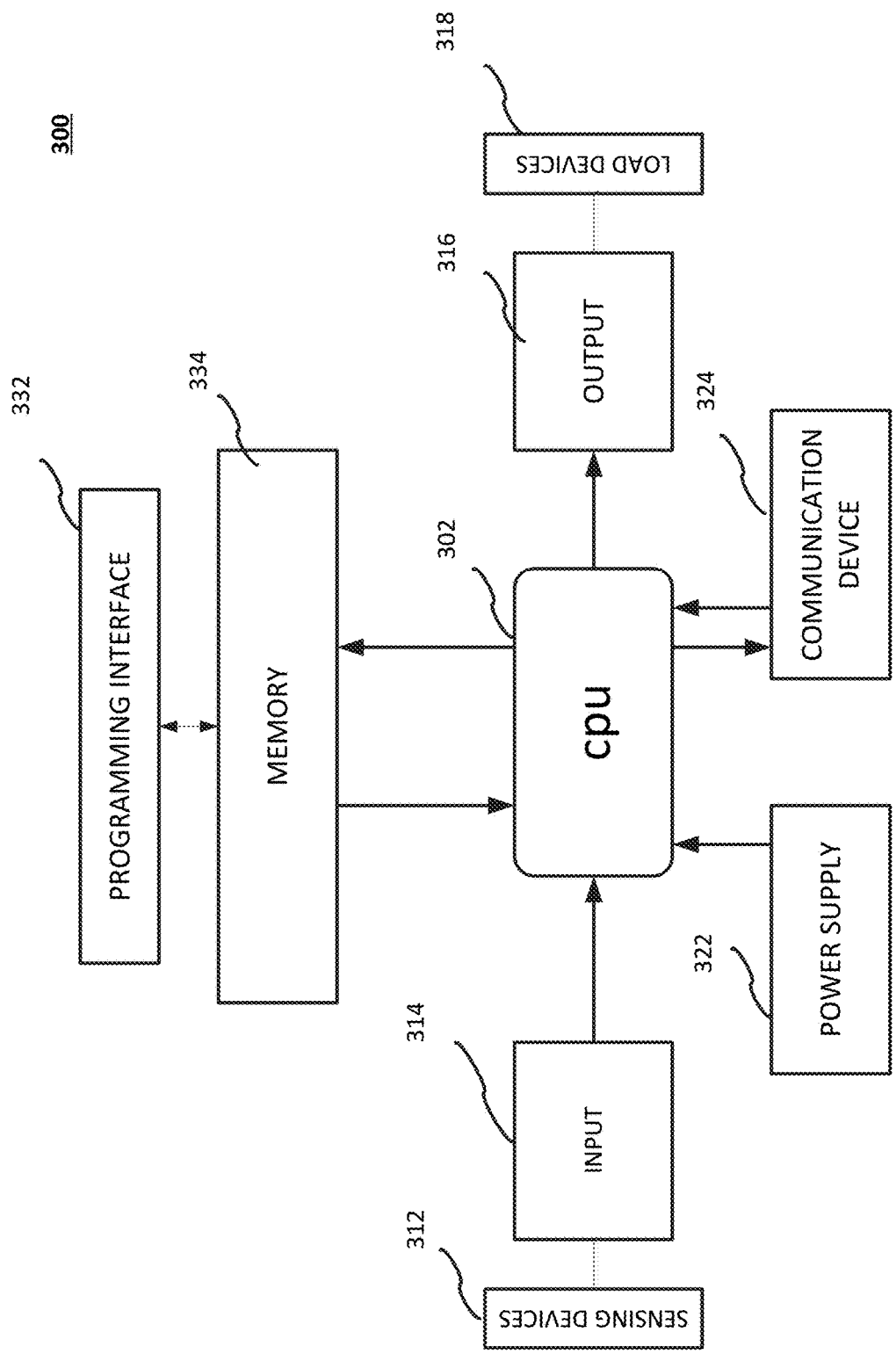
FIG. 3 is a block diagram for an exemplary programmable logic controller.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to an event-triggering control scheme for a discrete-time CPS that can stabilize control under hybrid simultaneous attacks of both DDoS and deception attacks affecting measurements as well as actuators signals. The control scheme can stabilize control in the case of DDoS attack that includes several strategies from simultaneous adversaries. The control scheme is designed for different possible scenarios of attacks. The control scheme can address most dangerous scenarios including hybrid simultaneous attacks. The control scheme provides an event-triggered approach to reduce the communication overhead in the system, where the sensor's signal is sent to the control system only when a predefined triggering condition is met.

Cyberphysical systems rely on information transparency and are particularly vulnerable to cyber-attacks and in particular, stealthy attacks. Cyber attacks can affect the operations of cyberphysical system and cause physical damage before there is any indication to those responsible for monitoring a cyberphysical system.

The presently disclosed control scheme is an observer-based control system affected by two kinds of attacks, DDoS and deception attacks. The attacks can occur in two communication channels, i.e. a forward channel connecting the sensors with the observer-based controller, and a backward channel connecting the controller with the actuators. Also, the control scheme considers a complex situation where the DDoS causes a delay in the system which makes it possible for the presence of a deception attack in the same instant, such that the signal transmitted could be delayed and changed at the same time.

In Mahmoud et al. (Cyber-Phys Syst (2019)), an observer-based controller was designed for CPSs in the presence of DoS and deception attacks with conditional probabilities that are variable. However, Mahmoud et al. (Cyber-Phys Syst (2019)) only considered an attack on the network's backward channel between the controller and the actuators and did not consider the case of simultaneous attacks.

FIGS. 4A, 4B, 4C, 4D show the effects of the cyber attacks on a transmitted (FIG. 4A) nominal signal in the presence of stochastic (FIG. 4B) DDoS attacks, (FIG. 4C) deception attacks, and (FIG. 4D) simultaneous attacks.

There are significant differences between when the CPS is affected by two kinds of attack in comparison with being affected by one kind of attack. Firstly, having a simultaneous hybrid attack (2D attack) on a CPS has a different impact compared to the impact on the traditional IT systems. In CPSs, the delayed data may cause serious and subsequent effects. For example, a scenario for a microgrid, in which the attack manipulates the frequency of data packets, the whole grid may collapse and cause a blackout to the whole power system in the area. In addition, these attacks are intelligent attacks and not simple delayed or missed packets as may happen in typical internet connection. In regard to a 3D attack, the security problem becomes extremely complex.

Control Scheme

Figure 5:
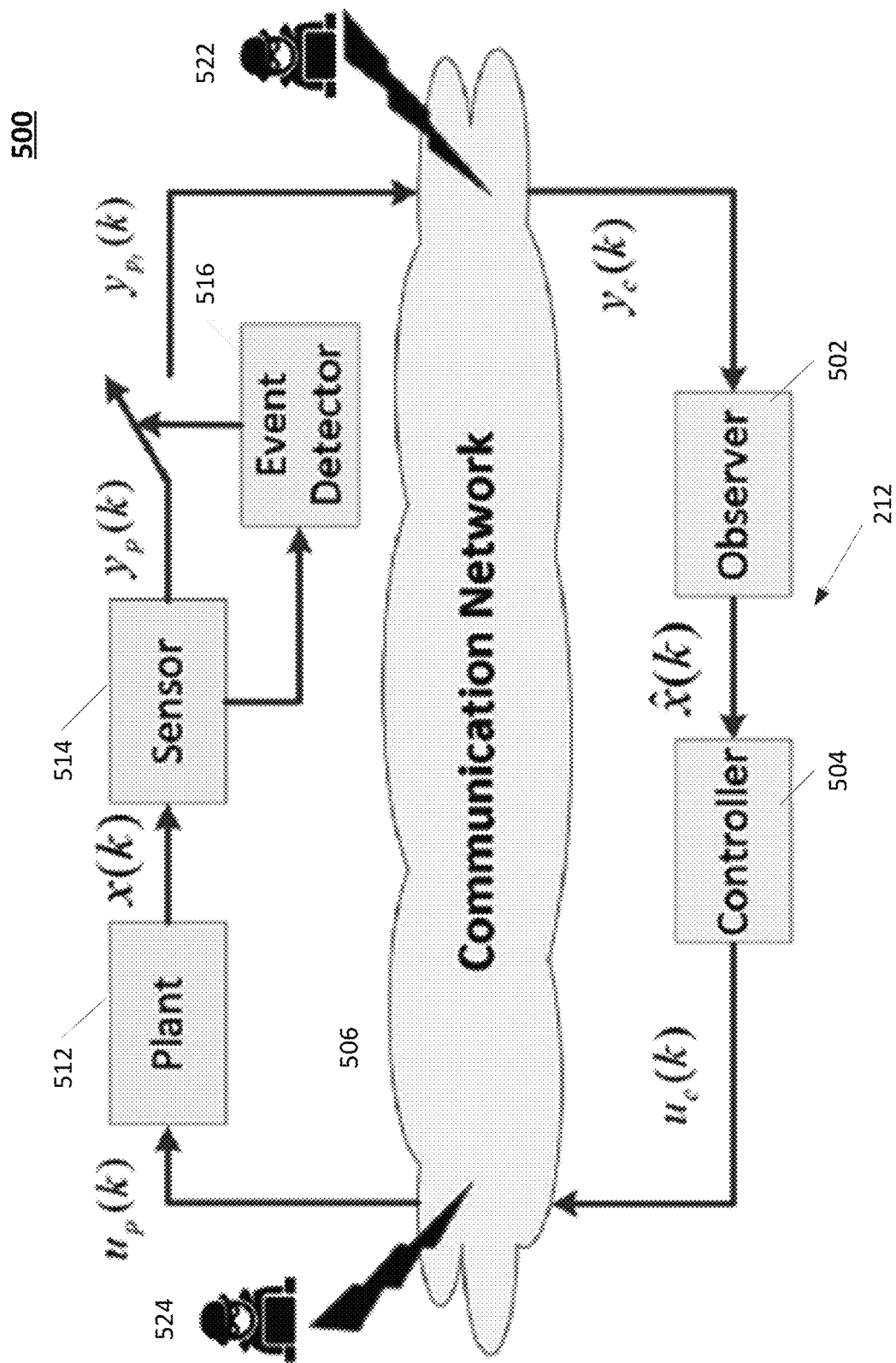
FIG. 5 illustrates a model of an observer based controller for a CPS system under cyber attacks.

FIG. 5 illustrates a model of an observer based controller for a CPS system under cyber attacks. As shown in FIG. 5, a cyberphysical system 500 can consist of plant 512, one or more sensors 514, an event-triggering mechanism 516, an observer mechanism 502, a controller 504, and communication system 506 as shown in FIG. 5. The CPS 500 is subjected to cyber attacks in the forward channel 522 (connecting the sensors with the observer based controller) and\or the backward channel 524 (connecting the controller with the actuators).

The plant 512 in the CPS 500 has the following discrete-time linear time-invariant (LTI) model:

$$x(k+1)=Ax(k)+Bu_p(k),$$

$$y_p(k)=Cx(k) \quad (1)$$

where $x(k) \in \Re^n$, $u_p(k) \in \Re^m$, and $y_p(k) \in \Re^p$ are the plant's state vector, the control input, and the output vector, respectively. A, B, and C are the plant matrices with appropriate dimensions.

The Event Triggering Mechanism

The transmitted signal in the previous event instant is saved, so it will be compared with the current output signal to activate the signals' transmitter for a discrete time CPS. The CPS is subjected to hybrid simultaneous DDoS and deception attacks.

The event triggering approach performed in the event detector 516 is applied to decrease the communication overhead among the elements of the CPS. The measurement of the sensors will be transmitted if the following condition is met:

$$e_y^T(k)e_y(k) \geq \varrho_1^2 \quad (2)$$

where $\varrho_1 > 0$ is a scalar, $e_y(k) = y_{p_t}(k) - y_p(k)$ and $y_{p_t}(k)$ is the transmitted signal in the last event instant. Here, $\varrho_1$ is determined by the operator based on the application. The transmitted signal $y_p(k)$ is saved in a memory of a programmable logic controller to process the comparison with the current output presented in equation (2).

Remark 1. The event triggered instants with the sequence of $0 < t_0 < t_1 \ldots < t_l < \ldots$ are calculated at each iteration by:

$$t_{l+1} = \inf[k \in \mathbb{N} |k > t_l, e_y^T(k)e_y(k) > \varrho_1^2]$$

So, for $k \in [k_l, k_{l+1})$, the signal received by the observer 502 $y_c(k)$ is equal to $y_{p_t}$, which is equal $e_y(k) + y_p(k)$.

Remark 2. The event-triggering applied can be established in view of the work of Mahmoud M S et al. in which, an event-triggered scheme is applied in distributed NCSs. See Mahmoud M S, Sabih M, Elshafei M. Event-triggered output feedback control for distributed networked systems. ISA Trans 2016;60:294-302, incorporated herein by reference in its entirety. The event-triggering in Mahmoud M S et al. is designed using the observed states instead of the exact signals. In the present control scheme, the measurements and transmitted signals are used in the event-triggering scheme as given by Equation (2), above.

The Attacks Model

In the present disclosure, the cyber physical system is under attack and packet loss is modeled using Bernoulli distribution.

Considering Remark 1, the measurement signal $y_c(k)$ after traversing the network, i.e. the signal received by the observer 502 is formulated as $$y_c(k) = (1-\alpha_1(k))[e_y(k)+y_p(k)+\alpha_2(k)(-e_y(k)-y_p(k)+\zeta_y(k))]+\alpha_1(k)[e_y(k-\tau_k^f)+y_p(k-\tau_k^f)-\alpha_2(k)y_p(k-\tau_k^f)+\alpha_2(k)\zeta_y(k\tau_k^f)] \quad (3)$$

In the present disclosure, the DDoS attack causes a delay $\tau_k^f$ with a Bernoulli distribution in the forward path. Also, the forward DDoS and deception attacks are considered to have Bernoulli distributed white sequences $\alpha_1(k)$ and $\alpha_2(k)$, respectively. The deception attack modifies the forward signal by $\zeta_y(k)$.

The DoS attacks may be misdiagnosed as a poor condition in the network, although the packet drop is not stealthy and can be easily detected. In early work on this problem, Cárdenas et al., Zhang et al., Schenato et al. (2007), Schenato et al. (2009), and Teixeira have modeled the DoS attack as Bernoulli distribution with constant probability. See Cárdenas et al.; Zhang et al.; Schenato et al. (2007); Schenato et al. (2009); and Teixeira A. Toward cyber-secure and resilient networked control systems (Ph.D. dissertation), KTH Royal Institute of Technology; 2014, each incorporated herein by reference in their entirety.

However, packet loss is stable and has the same behavior all the time. So, it is reasonable to model packet loss with constant probabilities as found in the literature. On the other hand, DDoS attack is a designed and manipulated attack that yields packet loss as a bi-product. Subsequently, there are important differences between the packet loss due to channel impairment and due to the DDoS attack. As a solution, in the present disclosure, the DDoS attack is modeled as Bernoulli distributed white sequences with conditional probabilities that are variable. The variable conditional probabilities allow the present model to catch the frequency of initiating the attack by the intruder. In addition, the attack duration is considered by defining boundaries of possible DDoS attack as shown in FIG. 4B. As such, the present model is closer to real-world DDoS attacks where the attacker manipulates the attack parameters such as the timing, duration, etc. Information about modeling a DoS attack can be found in Cetinkaya et al. and Mohan et al. See Cetinkaya A, Ishii H, Hayakawa T. An overview on denial-of-service attacks in control systems: Attack models and security analyses. Entropy 2019;21(2):210; and Mohan A M, Meskin N, Mehrjerdi H. A comprehensive review of the cyberattacks and cyber-security on load frequency control of power systems. Energies 2020;13(15):3860, each incorporated herein by reference in their entirety. A realistic model of the DDoS attack can be built using real traces/datasets of DDoS attacks.

Remark 3. For purposes of the analysis, the attack instants are assumed to be obtained in real time. In embodiments, the information related to the DDoS and deception attacks can be obtained online by using intrusion detection technology. A detector can include a communication detector, a control signal detector, and a fluid level detector, and the detector is configured with a signal emitter.

The Observer-Based Control Scheme

The observer-based control scheme below considers the existence of cyber attacks in the forward path 522:
The Observer 502:

$$\hat{x}(k+1) = A\hat{x}(k) + Bu_c(k) + L(y_c(k) - \hat{y}_c(k))$$

$$\hat{y}_c(k) = C\hat{x}(k) \quad (4)$$

The Controller 504:

$$u_c(k) = K\hat{x}(k)$$

$$u_p(k) = (1-\beta_1(k))[u_c(k) + \beta_2(k)(-u_c(k) + \zeta_u(k))] + \beta_1(k)[u_c(k-\tau_k^b) - \beta_2(k)(-u_c(k-\tau_k^b) + \zeta_u(k-\tau_k^b))] \quad (5)$$

where $\hat{x}(k) \in \mathfrak{R}^n$ and $\hat{y}_c(k) \in \mathfrak{R}^p$ are the estimate of the states (1), and the observer output, respectively. $K \in \mathfrak{R}^{m \times n}$ and $L \in \mathfrak{R}^{n \times p}$ are the controller and observer gains, respectively. The DDoS attack cause a delay $\tau_k^b$ with a Bernoulli distribution in the backward path 524.

The occurrence of the backward DDoS 524 and deception attacks are considered to have Bernoulli distributed white sequences $\beta_1(k)$ and $\beta_2(k)$, respectively, where, these stochastic variables are mutually independent of $\alpha_1(k)$ and $\alpha_2(k)$. The deception attack modifies the backward signal 524 by $\zeta_u(k)$.

The variables $\tau_k^b$ and $\tau_k^f$ are assumed to be time-varying satisfying the following boundaries:

$$\tau_f^{min} \le \tau_k^f \le \tau_f^{max}, \ \tau_b^{min} \le \tau_k^b \le \tau_b^{max} \quad (6)$$

In the present disclosure, all potential cyber-attack scenarios are considered, including, the occurrence of DDoS attack in the forward path, backward path, or both paths; the occurrence of a deception attack in the forward path, backward path, or both paths; and any other possible simultaneous attacks, e.g. deception attack in the forward path and simultaneous DDoS and deception attacks in the backward path. Effectively, there are 16 cases for the cyber physical system as shown in Table 1. Each case (i) occurs with a probability $p_i$ and an expected value $\hat{p}_i$. Furthermore, case no. 1 represents the system 500 when it is free of attacks, while case no. 16 represents the worst possible scenario where the system 500 is under simultaneous DDoS and deception attacks on all paths.

TABLE 1

Cases of the attacks.

| Case No. (i) | F. DDoS | B. DDoS | F. Deception | B. Deception |
|---|---|---|---|---|
| 1 | No | No | No | No |
| 2 | No | No | No | Yes |
| 3 | No | No | Yes | No |
| 4 | No | No | Yes | Yes |
| 5 | No | Yes | No | No |
| 6 | No | Yes | No | Yes |
| 7 | No | Yes | Yes | No |
| 8 | No | Yes | Yes | Yes |
| 9 | Yes | No | No | No |
| 10 | Yes | No | No | Yes |
| 11 | Yes | No | Yes | No |
| 12 | Yes | No | Yes | Yes |
| 13 | Yes | Yes | No | No |
| 14 | Yes | Yes | No | Yes |
| 15 | Yes | Yes | Yes | No |
| 16 | Yes | Yes | Yes | Yes |

F. refers to forward and B. refers to backward

Here the estimation error is $e(k) = x(k) - \hat{x}(k)$. Then, $$x(k+1) = [A - (1-\beta_1(k))(1-\beta_2(k))BK]x(k) + [-(1-\beta_1(k))(1-\beta_2(k))BK]e(k) + [\beta_1(k)(1-\beta_2(k))BK]x(k-\tau_k^b) + [-\beta_1(k)(1-\beta_2(k))BK]e(k-\tau_k^b) + (1-\beta_1(k))\beta_2(k)B\zeta_u(k) + \beta_1(k)\beta_2(k)B\zeta_u(k-\tau_k^b) \quad (7)$$

$$e(k+1) = [(1-\beta_1(k))(1-\beta_2(k))BK - (1-\alpha_1(k))(1-\alpha_2(k))LC - BK + LC]x(k) + [-(1-\beta_1(k))(1-\beta_2(k))BK + A + BK - LC]e(k) + [\beta_1(k)(1-\beta_2(k))BK]x(k-\tau_k^b) + [-\beta_1(k)(1-\beta_2(k))BK]e(k-\tau_k^b) + [-\alpha_1(k)(1-\alpha_2(k))LC]x(k-\tau_k^f) + (1-\beta_1(k))\beta_2(k)B\zeta_u(k) - (1-\alpha_1(k))\alpha_2(k)L\zeta_y(k) + \beta_1(k)\beta_2(k)B\zeta_u(k-\tau_k^b) - \alpha_1(k)\alpha_2(k)L\zeta_y(k-\tau_k^f) - (1-\alpha_1(k))L]e_y(k) + [-\alpha_1(k)(1-\alpha_2(k))]e_y(k-\tau_k^f) \quad (8)$$

Let us define $\xi(k) = [x^T(k) \ e^T(k)]^T$, then (7) and (8) is represented by:

$$\xi_j(k+1) = \overline{A}_j \xi(k) + \overline{B}_j \xi(k-\tau_k^f) + \overline{C}_j \xi(k-\tau_k^b) + \overline{D}_j \zeta(k) + \overline{E}_j \zeta(k-\tau) + \overline{F}_j e_j(k),$$

$$j = 1, \ldots 16 \quad (9)$$

with $\zeta(k) = [\zeta_u^T(k) \ \zeta_y^T(k)]^T, \zeta(k-\tau) = [\zeta_u^T(k-\tau_k^b) \ \zeta_y^T(k-\tau_k^f)]^T$, $\overline{e}_j(k) = [e_y^T(k) \ e_y^T(k-\tau_k^f)]^T$ and $\{\overline{A}_j, \overline{B}_j, \overline{C}_j, \overline{D}_j, \overline{E}_j, \overline{F}_j, j = 1, \ldots, 16\}$ and j is an index that represents each situation of the system with the following values:

(10)

$$\overline{A}_j = \begin{cases} \begin{bmatrix} A+BK & -BK \\ 0 & A-LC \end{bmatrix} & \text{for } j = 1 \\ \begin{bmatrix} A & 0 \\ -BK & A+BK-LC \end{bmatrix} & \text{for } j = 2, 3, 4 \\ \begin{bmatrix} A+BK & -BK \\ LC & A-LC \end{bmatrix} & \text{for } j = 5, 9, 13 \\ \begin{bmatrix} A & 0 \\ -BK+LC & A+BK-LC \end{bmatrix} & \text{for } j = 6, 7, 8, 10, 11, 12, 14, 15, 16 \end{cases}$$

$$\overline{B}_j = \begin{cases} \begin{bmatrix} 0 & 0 \\ -LC & 0 \end{bmatrix} & \text{for } j = 9, \ldots, 12 \\ 0 & \text{for others} \end{cases}$$

$$\overline{C}_j = \begin{cases} \begin{bmatrix} BK & -BK \\ BK & -BK \end{bmatrix} & \text{for } j = 3, 7, 11, 15 \\ 0 & \text{for others} \end{cases}$$

$$\overline{D}_j = \begin{cases} \begin{bmatrix} B & 0 \\ B & 0 \end{bmatrix} & \text{for } j = 2, 10, 14 \\ \begin{bmatrix} 0 & 0 \\ 0 & -L \end{bmatrix} & \text{for } j = 5, 7, 8 \\ \begin{bmatrix} B & 0 \\ B & -L \end{bmatrix} & \text{for } j = 6 \\ 0 & \text{for others} \end{cases}$$

$$\overline{E}_j = \begin{cases} \begin{bmatrix} B & 0 \\ B & 0 \end{bmatrix} & \text{for } j = 4, 8, 12 \\ \begin{bmatrix} 0 & 0 \\ 0 & -L \end{bmatrix} & \text{for } j = 13, 14, 15 \\ \begin{bmatrix} B & 0 \\ B & -L \end{bmatrix} & \text{for } j = 16 \\ 0 & \text{for others} \end{cases}$$

-continued $$\overline{F}_j = \begin{cases} \begin{bmatrix} 0 & 0 \\ -L & 0 \end{bmatrix} & \text{for } j = 1, \ldots, 4 \\ \begin{bmatrix} 0 & 0 \\ 0 & -L \end{bmatrix} & \text{for } j = 9, \ldots, 12 \\ 0 & \text{for others} \end{cases}$$

Remark 4. In the present disclosure, the deception attack is deemed to be an arbitrary energy signal satisfying a boundary given by:

$$\zeta^T\zeta < \varrho_2^2 \quad (11)$$

Definition 1. Let $\varrho_1$, $\varrho_2$, $\varrho_3 > 0$ are given scalars. Then, system (9) is called $\varrho_1$, $\varrho_2$, $\varrho_3$ secure if, when $e_y^T(k)e_y(k) \leq \varrho_1^2$ and $\zeta^T\zeta < \varrho_2^2$ then the dynamics evolution of the considered system in the mean square sense is bounded by $\mathbb{E}\|\xi(k)\|^2 \leq \varrho_3^2$ for all k.

Design Results

An objective is to build an event-triggering control scheme as formulated in Equations (4) and (5) such that the overall cyber physical system (9) is $\varrho_1$, $\varrho_2$, $\varrho_3$ secure based on Definition 1. For simplicity, each probability and its expected value are denoted as $p_j$ and $\mathbb{E}[p_j]$, respectively, and j=1, . . . , 16.

Remark 5. The present approach may be described relative to the work of Mahmoud et al. (Cyber-Phys Syst (2019)), Mahmoud M S (J Optim Theory Appl (2009)), and Mahmoud M S (Internat J Systems Sci (2020)). See Mahmoud et al. (Cyber-Phys Syst (2019)); Mahmoud M S, Xia Y. Robust stability and stabilization of a class of nonlinear switched discrete-time systems with time-varying delays. J Optim Theory Appl 2009;143(2):329-55; and Mahmoud M S, Hamdan M M, Baroudi U A. Secure control of cyber physical systems subject to stochastic distributed dos and deception attacks. Internat J Systems Sci 2020;1-16, each incorporated herein by reference in their entirety. However, a difference between the present approach and the previous work is that the previous work considers only an attack on the network between the controller and the actuators. The previous work did not consider the case of simultaneous attacks. See Mahmoud et al. (Cyber-Phys Syst (2019)) and Mahmoud M S (Internat J Systems Sci (2020)). In the present disclosure, all possible scenarios of attacks are considered including the simultaneous scenario, which is more dangerous in industrial applications. Moreover, an event-triggered mechanism 516 is implemented to decrease the communication overhead in the system, where the sensor's signal is sent only when a particular triggering condition is met.

The following candidate Lyapunov function will be used to derive the main theorems:

$$V(\xi(k)) = \sum_{i=1}^{7} V_i(\xi(k)) \quad (12)$$

with $$V_1(\xi(k)) = \sum_{j=1}^{16} \xi^T(k)P\xi(k), \; P > 0 \quad (13)$$

$$V_2(\xi(k)) = \sum_{j=1}^{16} \sum_{i=k-\tau_k^f}^{k-1} \xi^T(i)Q_i\xi(i), \; Q_i = Q_j^T > 0$$

$$V_3(\xi(k)) = \sum_{j=1}^{16} \sum_{i=k-\tau_k^D}^{k-1} \xi^T(i)Q_j\xi(i)$$

$$V_4(\xi(k)) = \sum_{j=1}^{16} \sum_{i=k-\tau}^{k-1} \zeta^T(i)Q_j\zeta(i)$$

$$V_5(\xi(k)) = \sum_{j=1}^{16} \sum_{\ell=-\tau_f^{max}+2}^{-\tau_f^{min}+1} \sum_{i=k+\ell-1}^{k-1} \xi^T(i)Q_j\xi(i)$$

$$V_6(\xi(k)) = \sum_{j=1}^{16} \sum_{\ell=-\tau_D^{max}+2}^{-\tau_D^{min}+1} \sum_{i=k+\ell-1}^{k-1} \xi^T(i)Q_j\xi(i)$$

$$V_7(\xi(k)) = \sum_{j=1}^{16} \sum_{\ell=-\tau^{max}+2}^{-\tau^{min}+1} \sum_{i=k+\ell-1}^{k-1} \zeta^T(i)Q_j\zeta(i)$$

Theorem 1. Given the scalars $\varrho_1$, $\varrho_2$, $\varrho_3 > 0$ and for a given observer based controller represented by (4) and (5) with gains K and L, system (9) is $\varrho_1$, $\varrho_2$, $\varrho_3$ secure if there exist positive matrices P, $Q_j^T = Q_j$, $S_j^T = S_j$, j=1, . . . , 16 and positive scalars $\zeta_1$ and $\zeta_2$ satisfying the following LMI:

$$\begin{cases} Y_j < 0 \\ \dfrac{\theta^2 q_0^2}{\lambda_{min}(P)(q_0 - 1)} \leq \varrho_3^2 \end{cases} \quad (14)$$

where $$Y_j = \begin{bmatrix} Y_{11j} & Y_{12j} & Y_{13j} & Y_{14j} & Y_{15j} & Y_{16j} \\ \cdot & Y_{22j} & Y_{23j} & Y_{24j} & Y_{25j} & Y_{26j} \\ \cdot & \cdot & Y_{33j} & Y_{34j} & Y_{35j} & Y_{36j} \\ \cdot & \cdot & \cdot & Y_{44j} & Y_{45j} & Y_{46j} \\ \cdot & \cdot & \cdot & \cdot & Y_{55j} & Y_{56j} \\ \cdot & \cdot & \cdot & \cdot & \cdot & Y_{66j} \end{bmatrix} \quad (15)$$

$Y_{11j} = \overline{A}_j^T \hat{p}_j P \overline{A}_j - P + \phi_1$ $Y_{12j} = \overline{A}_j^T \hat{p}_j P \overline{B}_j$, $Y_{13j} = \overline{A}_j^T \hat{p}_j P \overline{C}_j$, $Y_{14j} = \overline{A}_j^T \hat{p}_j P \overline{D}_j$, $Y_{15j} = \overline{A}_j^T \hat{p}_j P \overline{E}_j$, $Y_{16j} = \overline{A}_j^T \hat{p}_j P \overline{F}_j$, $Y_{22j} = \overline{B}_j^T \hat{p}_j P \overline{B}_j - \hat{p}_j Q_j$, $Y_{23j} = \overline{B}_j^T \hat{p}_j P \overline{C}_j$ $Y_{24j} = \overline{B}_j^T \hat{p}_j P \overline{D}_j$, $Y_{25j} = \overline{B}_j^T \hat{p}_j P \overline{E}_j$, $Y_{26j} = \overline{B}_j^T \hat{p}_j P \overline{F}_j$, $Y_{33j} = \overline{C}_j^T \hat{p}_j P \overline{C}_j - \hat{p}_j Q_j$, $Y_{34j} = \overline{C}_j^T \hat{p}_j P \overline{D}_j$, $Y_{35j} = \overline{C}_j^T \hat{p}_j P \overline{E}_j$, $Y_{36j} = \overline{C}_j^T \hat{p}_j P \overline{F}_j$, $Y_{44j} = \overline{D}_j^T \hat{p}_j P \overline{D}_j + \phi_2$, $Y_{45j} = \overline{D}_j^T \hat{p}_j P \overline{E}_j$, $Y_{46j} = \overline{D}_j^T \hat{p}_j P \overline{F}_j$, $Y_{55j} = \overline{E}_j^T \hat{p}_j P \overline{E}_j + \hat{p}_j S_j$, $Y_{56j} = \overline{E}_j^T \hat{p}_j P \overline{F}_j$, $Y_{66j} = \overline{F}_j^T \hat{p}_j P \overline{F}_j - \varsigma_1 I$ with $\phi_1 = \hat{p}_j(\tau_f^{max} - \tau_f^{min} + \tau_b^{max} - \tau_b^{min} + 2)Q_j$ -continued
$$\phi_2 = (\tau^{max} - \tau^{min} + 1 - \varsigma_2)I.$$

and $\theta^2 = \varsigma_1 \varrho_1^2 + \varsigma_2 \varrho_2^2$

The proof of Theorem 1 is detailed later.

Remark 6. Theorem 1 provides a stability condition for a closed loop system represented by (9), including a linear or linearized system as in (1), and the gains of the controller 504 and the observer 502 have certain values. Also, the CPS affected by hybrid simultaneous DDoS and deception attacks. The DDoS attacks produce delays in the network with boundaries as shown in Equation (6). Moreover, the deception attacks cause a modification in the transmitted signal with a certain boundary. Also the implementation of Theorem 1 needs to call random generators to select numbers related to the scalars $\hat{p}_j$, j=1, ..., 16 for computing the state and the error trajectories. See Mahmoud M, Selim S, Shi P, Baig M. New results on networked control systems with non-stationary packet dropouts. IET Control Theory Appl 2012;6(15):2442-52, incorporated herein by reference in its entirety. This feature is not shared by other methods in the literature for secure control of CPSs.

Theorem 2. Given the positive scalars $\varrho_1$, $\varrho_2$, $\varrho_3$, a delay bounds $\tau_f^{max}$, $\tau_f^{min}$, $\tau_b^{max}$, $\tau_b^{min}$, $\tau^{max}$, $\tau^{min}$, and $\hat{p}_j$, j=1, ..., 16, matrices X, Y$_1$, Y$_2$, $\Xi_j$>0, j=1, ... 16, and positive scalars $\zeta_1$ and $\zeta_2$. System (9) is $\varrho_1$, $\varrho_2$, $\varrho_3$ secure if there exist an observer based controller represented by (4) and (5) with gains of K and L satisfying the following LMI:

$$\begin{cases} \Omega \leq 0 & (16) \\ \dfrac{\theta^2 q_0^2}{\lambda_{min}(P)(q_0-1)} \leq \varrho_3^2 \end{cases}$$

where:

$$\Omega = \begin{bmatrix} \hat{p}_j \hat{X} & 0 & 0 & 0 & 0 & 0 & \\ \cdot & -\hat{p}_j Q_j & 0 & 0 & 0 & 0 & \\ \cdot & \cdot & -\hat{p}_j Q_j & 0 & 0 & 0 & \hat{\Theta}_j \\ \cdot & \cdot & \cdot & \phi_2 & 0 & 0 & \\ \cdot & \cdot & \cdot & \cdot & -\hat{p}_j S_j & 0 & \\ \cdot & \cdot & \cdot & \cdot & \cdot & -\varsigma_1 I & \\ & & & \cdot & & & -\hat{p}_j \hat{X} \end{bmatrix} \quad (17)$$

with $$\hat{X} = \begin{bmatrix} X & 0 \\ 0 & X \end{bmatrix}, \quad (18)$$

$$\hat{\Theta}_j = [\hat{\Theta}_{1j} \ \overline{B}_j^T \ \overline{C}_j^T \ \overline{D}_j^T \ \overline{E}_j^T \ \overline{F}_j^T]^T \quad (19)$$

$$\hat{\Theta}_{1j} = \begin{cases} \begin{bmatrix} X\overline{A}^T & -Y^T \overline{B}^T + Z^T \\ 0 & X\overline{A}^T + Y^T \overline{B}^T - Z^T \end{bmatrix}, & j=1,2,3,5,6,7,9,10,11 \\ \begin{bmatrix} X\overline{A}^T + Y^T \overline{B}^T & Z^T \\ -Y^T \overline{B}^T & X\overline{A}^T - Z^T \end{bmatrix}, & j=4,8,12 \\ \begin{bmatrix} X\overline{A}^T & -Y^T \overline{B}^T \\ 0 & X\overline{A}^T + Y^T \overline{B}^T - Z^T \end{bmatrix}, & j=13,14,15 \\ \begin{bmatrix} X\overline{A}^T + Y^T \overline{B}^T & 0 \\ -Y^T \overline{B}^T & X\overline{A}^T - Z^T \end{bmatrix}, & j=16 \end{cases}$$

Moreover, the observer based controller parameters are K=YX$^{-1}$ and L=ZX$^{-1}$C$^\setminus$ Proof. Let us define:

$$\Theta_j = [\overline{A}_j \ \overline{B}_j \ \overline{C}_j \ \overline{D}_j \ \overline{E}_j \ \overline{F}_j]^T$$

Now, inequality (15) can be represented as:

$$Y_j = \tilde{Y}_j + \Theta_j P \Theta_j^T < 0 \quad (20)$$

$$\tilde{Y}_j = \text{diag}\{-P + \phi_1, -\hat{p}_j Q_j, -\hat{p}_j Q_j, \phi_2, -\hat{p}_j Q_j\} \quad (21)$$

By selecting $\hat{X} = P^{-1}$, then apply Schur complements, matrix $Y_j$ in Equation (20) is formulated as:

$$\begin{bmatrix} -\hat{p}_j \hat{X} & 0 & 0 & 0 & 0 & 0 & \\ \cdot & -\hat{p}_j Q_j & 0 & 0 & 0 & 0 & \\ \cdot & \cdot & -\hat{p}_j Q_j & 0 & 0 & 0 & \hat{\Theta}_j \\ \cdot & \cdot & \cdot & \phi_2 & 0 & 0 & \\ \cdot & \cdot & \cdot & \cdot & -\hat{p}_j S_j & 0 & \\ \cdot & \cdot & \cdot & \cdot & \cdot & -\varsigma_1 I & \\ & & & \cdot & & & -\hat{p}_j \hat{X} \end{bmatrix} < 0 \quad (22)$$

Perform multiplication from right and left on the matrix inequality Equation (21) by diag [$\hat{X}$, I, I, I, I, I, I] then apply Equation (18), matrix inequality Equation (17) subject Equation (19) is obtained.

The problem of controlling systems while considering the occurrence of hybrid attacks, such as affecting the system with DDoS and deception attacks simultaneously, has no conventional solution.

The improved event-triggering control scheme as proposed by Theorem 2 provide a procedure to design a $\varrho_1$, $\varrho_2$, $\varrho_3$ secure observer based controller as presented in (4) and (5) as provided by Definition 1 for a discrete-time CPS in the form of (1) affected by hybrid simultaneous attacks of both DDoS and deception attacks affecting measurements as well as actuator signals.

Remark 8. It is noted from the previous discussion that only linear plants in the simple form of (1) are considered. However, the present CPS control approach is not limited to linear plants. The present CPS control approach is also applicable to nonlinear applications which can be linearized in the aforementioned form. Extending to nonlinear applications, allows for a wide range of practical applications such as the quadruple-tank system and a single machine connected to an infinite bus as will be explained below. Moreover, all theorems are valid to nonlinear systems in the following form:

$$f(x(k)) = Ax(k) + Bu(k) + g(x, u) \quad (23)$$

where g(x, u) is a nonlinear function satisfies a certain boundary.

ILLUSTRATIVE EXAMPLES

Example 1: Quadruple-Tank CPS

Figure 6:
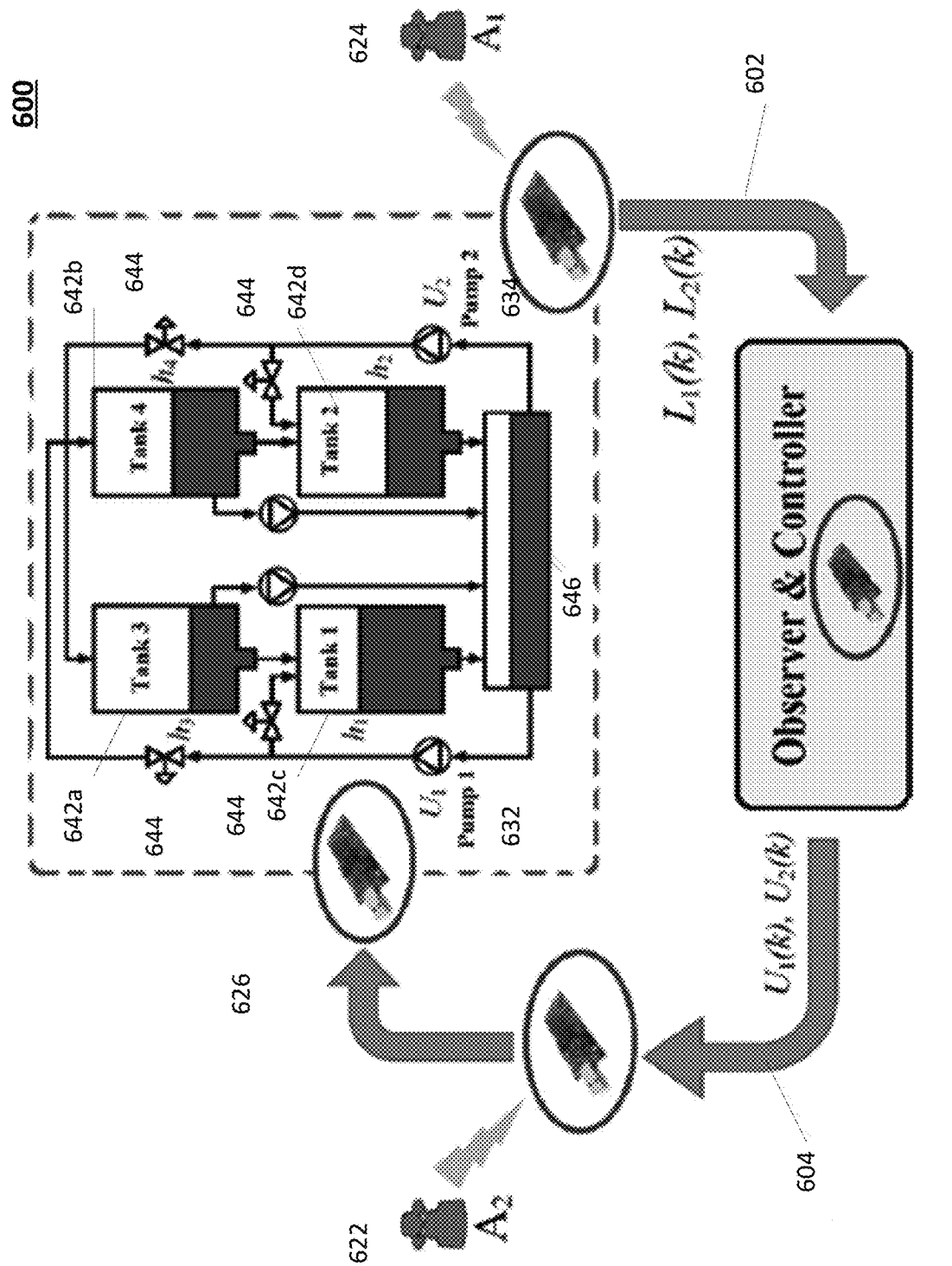
FIG. 6 illustrates a scheme of quadruple-tank CPS.

FIG. 6 illustrates a scheme of quadruple-tank CPS. The present control scheme is applied in an illustrative example of a quadruple-tank process. Two pumps 642a, 642b are used for controlling the level of the lower two tanks 642c, 642d.

The system contains two inputs and two outputs. In this example, the attacker can disrupt the CPS by DoS attack, deception attack, or hybrid simultaneous attacks in the forward direction as in (A$_1$), the backward direction as in (A$_2$), or both of them (A$_1$) and (A$_2$).

The model as per described in Johansson. See Johansson K H. The quadruple-tank process: A multivariable laboratory process with an adjustable zero. IEEE Trans Control Syst Technol 2000;8(3):456-65, incorporated herein by reference in its entirety.

$$\dot{h}_1(t) = -\frac{a_1}{\bar{a}_1}\sqrt{2gh_1(t)} + \frac{a_3}{\bar{a}_1}\sqrt{2gh_3(t)} + \frac{c_1 k_1}{\bar{a}_1} U_1(t),$$

$$\dot{h}_2(t) = -\frac{a_2}{\bar{a}_2}\sqrt{2gh_2(t)} + \frac{a_4}{\bar{a}_2}\sqrt{2gh_4(t)} + \frac{c_2 k_2}{\bar{a}_2} U_2(t),$$

$$\dot{h}_3(t) = -\frac{a_3}{\bar{a}_3}\sqrt{2gh_3(t)} + \frac{(1-c_2)k_2}{\bar{a}_3} U_2(t),$$

$$\dot{h}_4(t) = -\frac{a_4}{\bar{a}_4}\sqrt{2gh_4(t)} + \frac{(1-c_1)k_1}{\bar{a}_4} U_1(t),$$

$$\ell_1(t) = h_1(t),\ \ell_2(t) = h_2(t)$$

with $h_i$ representing the level of water in tank i, $\bar{a}_i$, $a_i$, $k_i$, $c_i$, and g are parameters in the system. As shown in FIG. 6, there are two outputs 602 $\ell_1(t)$ and $\ell_2(t)$ representing the level of water the two tanks, and two inputs 604 representing the voltages driving the pumps, $U_1(t)$ and $U_2(t)$.

The linearized systems at a given equilibrium point $(h_i^o, u_i^o, y_i^o)$ with the state $x_i(t) = h_i(t) - h_i^o$, input $u_i(t) = U_i(t) - U_i^o$, and output $y_i(t) = y_i(t) - \ell_i^0$ is represented by:

$$x(k+1) = Ax(k) + Bu(k),\ y(k) = Cx(k)$$

with $$A = \begin{bmatrix} -0.0159 & 0 & 0.0309 & 0 \\ 0 & -0.0110 & 0 & 0.0222 \\ 0 & 0 & -0.0309 & 0 \\ 0 & 0 & 0 & -0.0222 \end{bmatrix}$$

$$B = \begin{bmatrix} 0.0636 & 0 \\ 0 & 0.0488 \\ 0 & 0.0628 \\ 0.0456 & 0 \end{bmatrix}$$

$$C = \begin{bmatrix} 1 & 0 & 0 & 0 \\ 0 & 1 & 0 & 0 \end{bmatrix}$$

An observer based controller 612 is used for controlling this CPS placed in a remote center. The communication network is a wireless network with four nodes. By applying Theorem 2, the gains of the controller K and the observer L are found to be:

$$K = \begin{bmatrix} -5.0810 & -0.7155 & 0.5520 & -4.3266 \\ -0.4143 & -3.9718 & -5.2888 & 0.5746 \end{bmatrix} \quad (24)$$

$$L = \begin{bmatrix} 1.3862 & -0.0862 \\ -0.0375 & 1.6380 \\ -0.0486 & -0.4662 \\ -0.4410 & -0.0623 \end{bmatrix}$$

Figure 7:
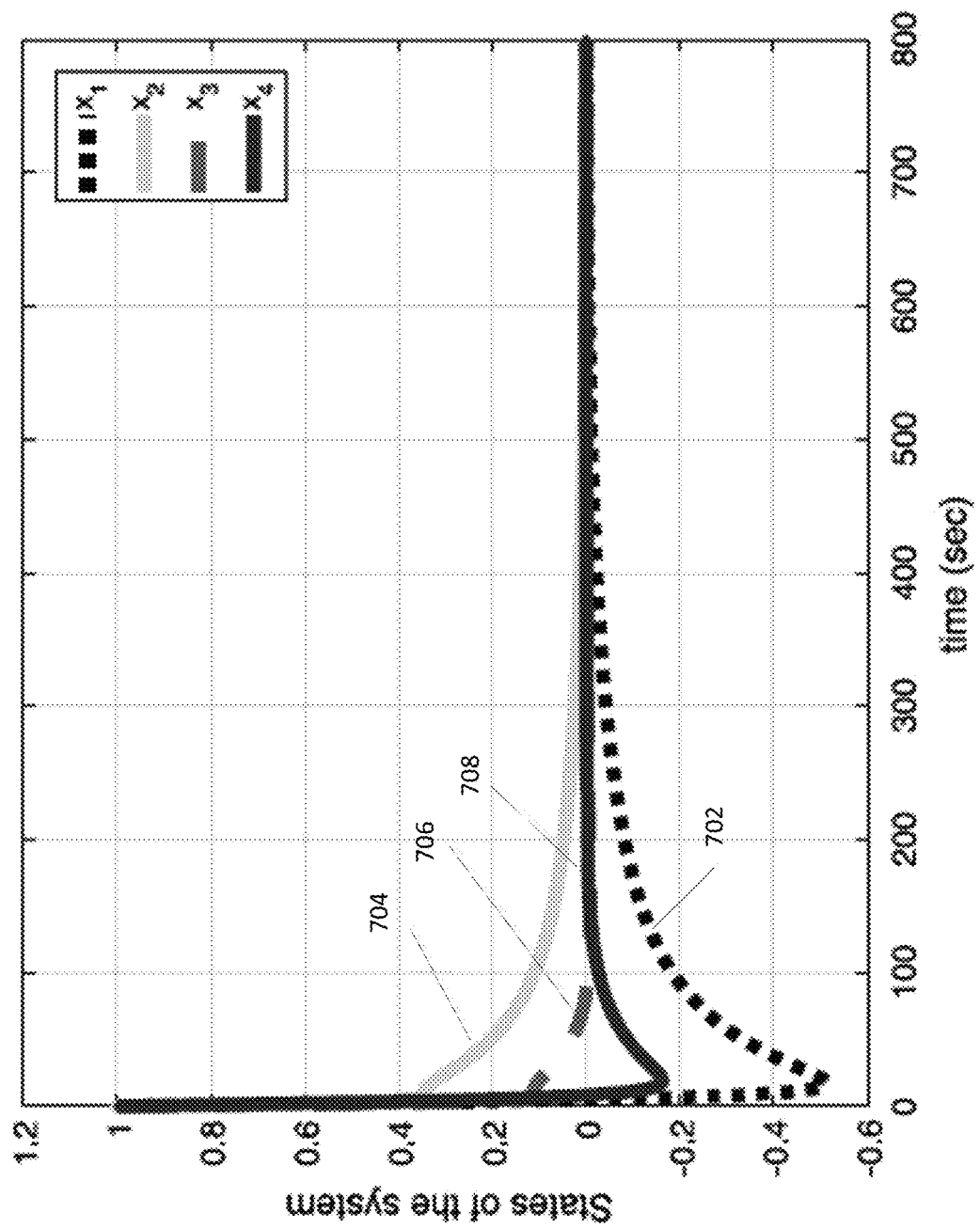
FIG. 7 is a graph illustrating the system free of attacks.
Figure 8A:
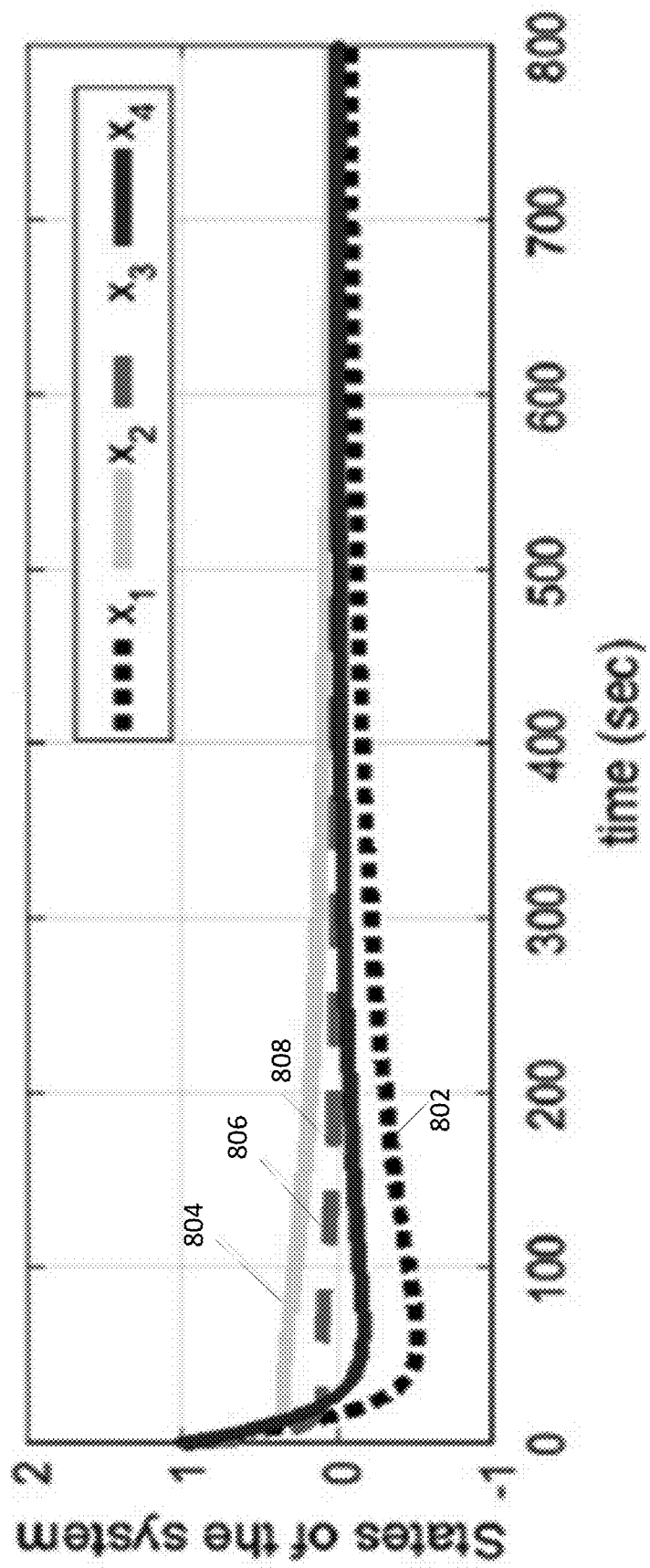
FIGS. 8A-8C are graphs illustrating the states of the system under DDoS attack.
Figure 8B:
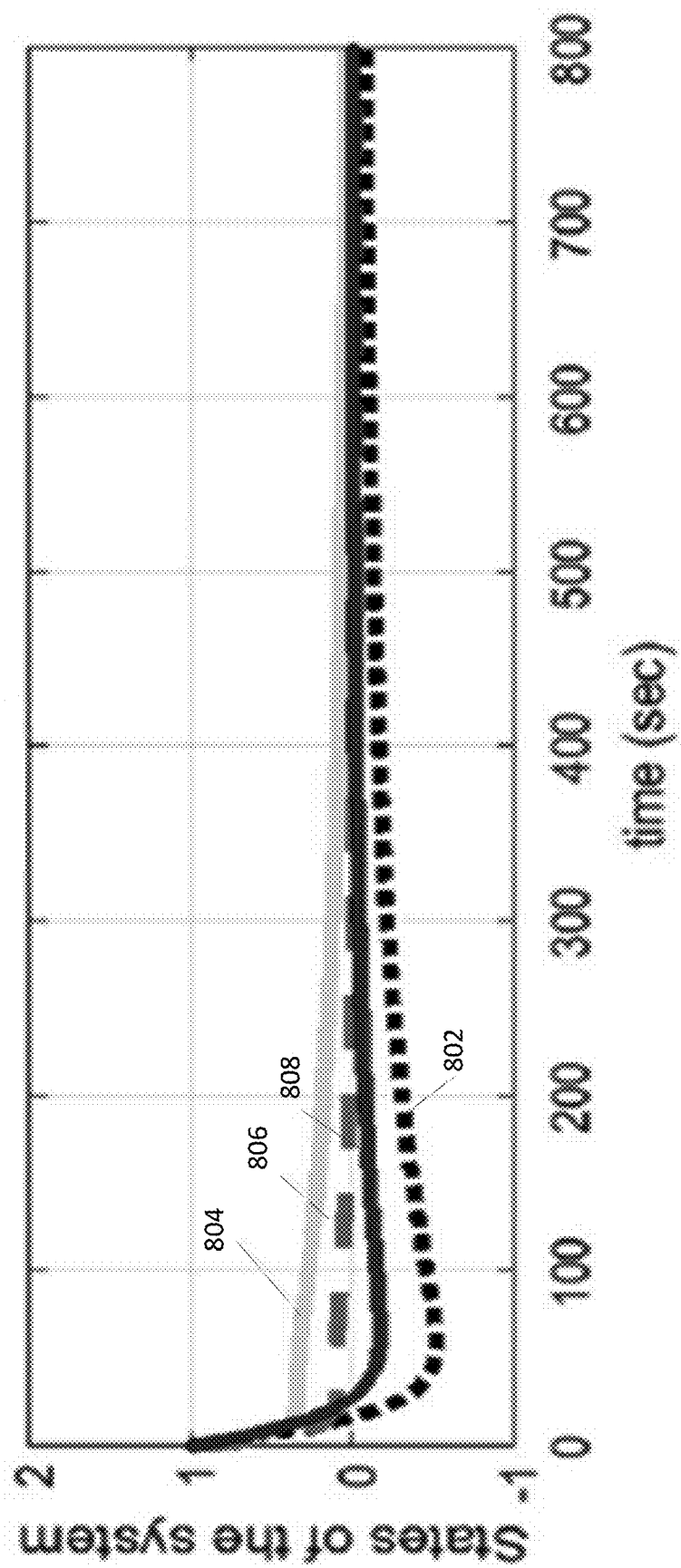
Figure 8C:
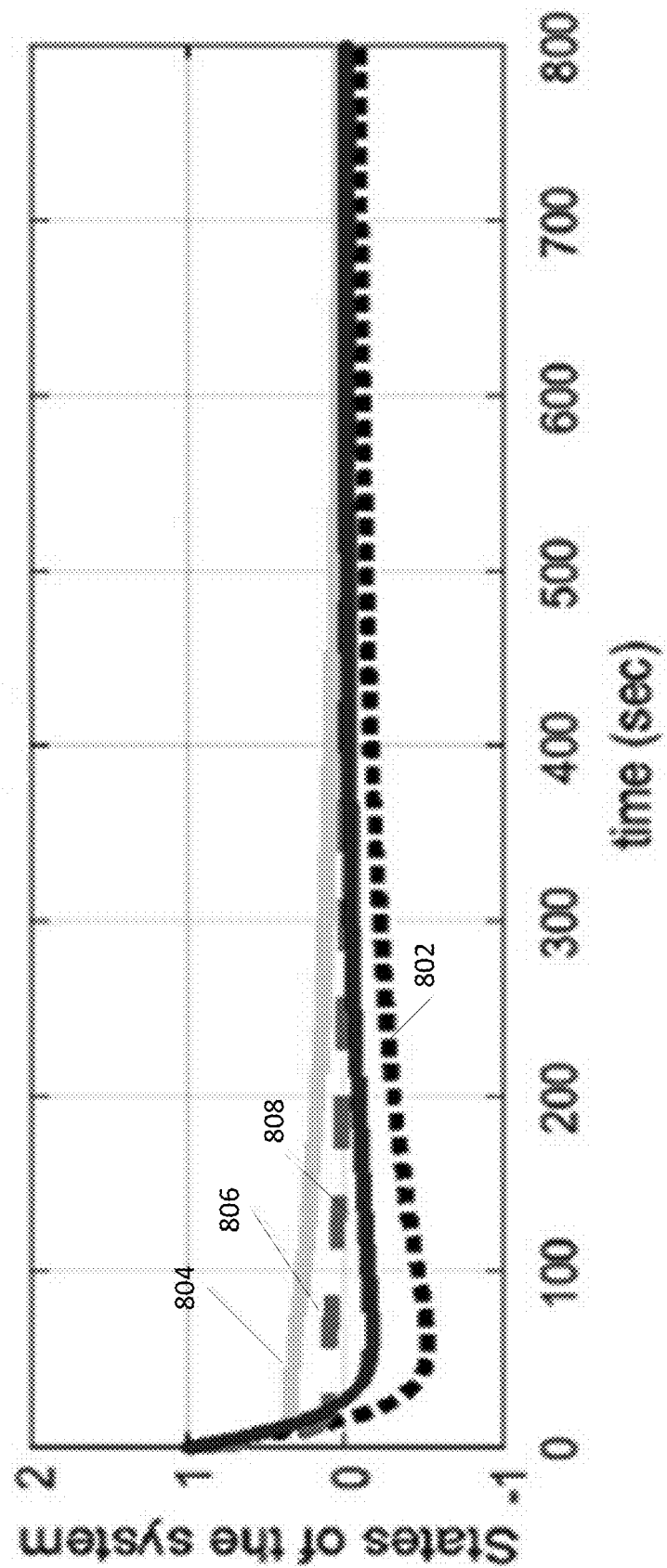
Figure 9A:
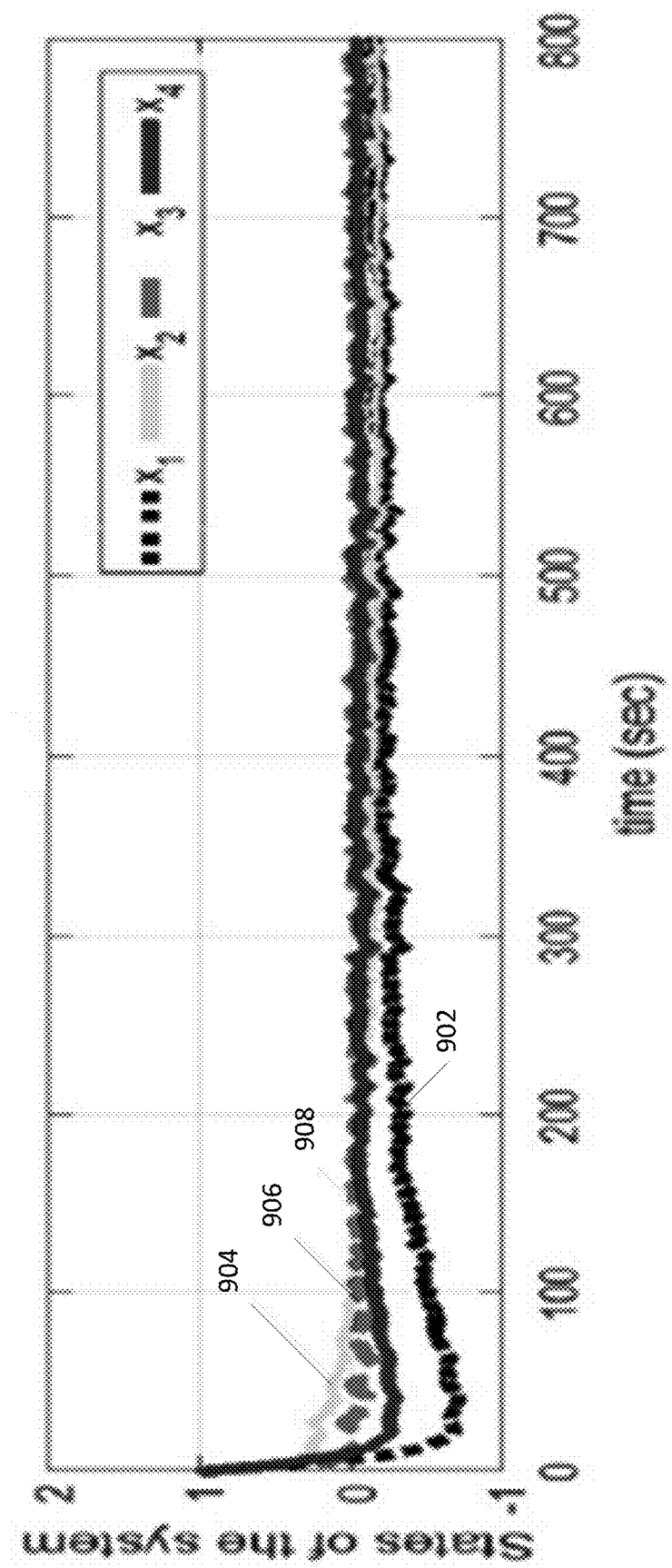
FIGS. 9A-9C are graphs illustrating the states of the system under deception attacks.
Figure 9B:
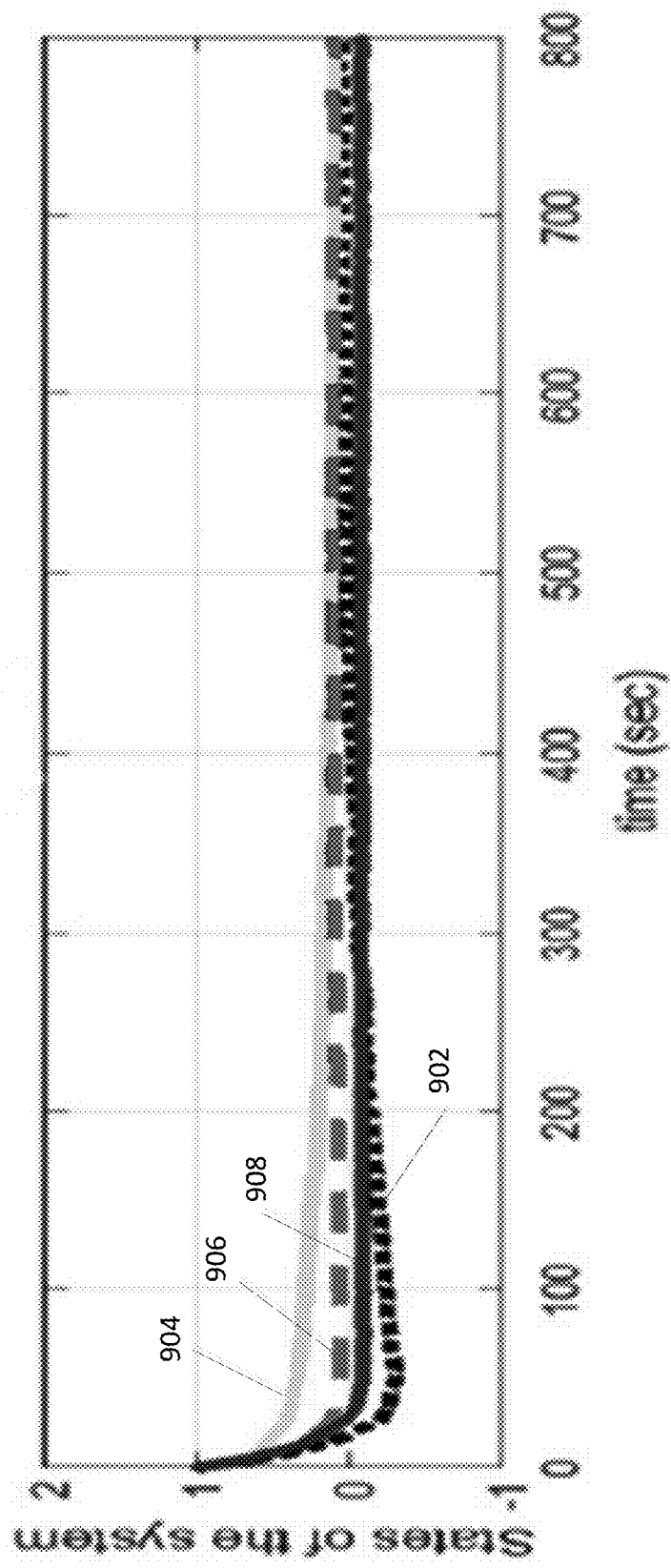
Figure 9C:
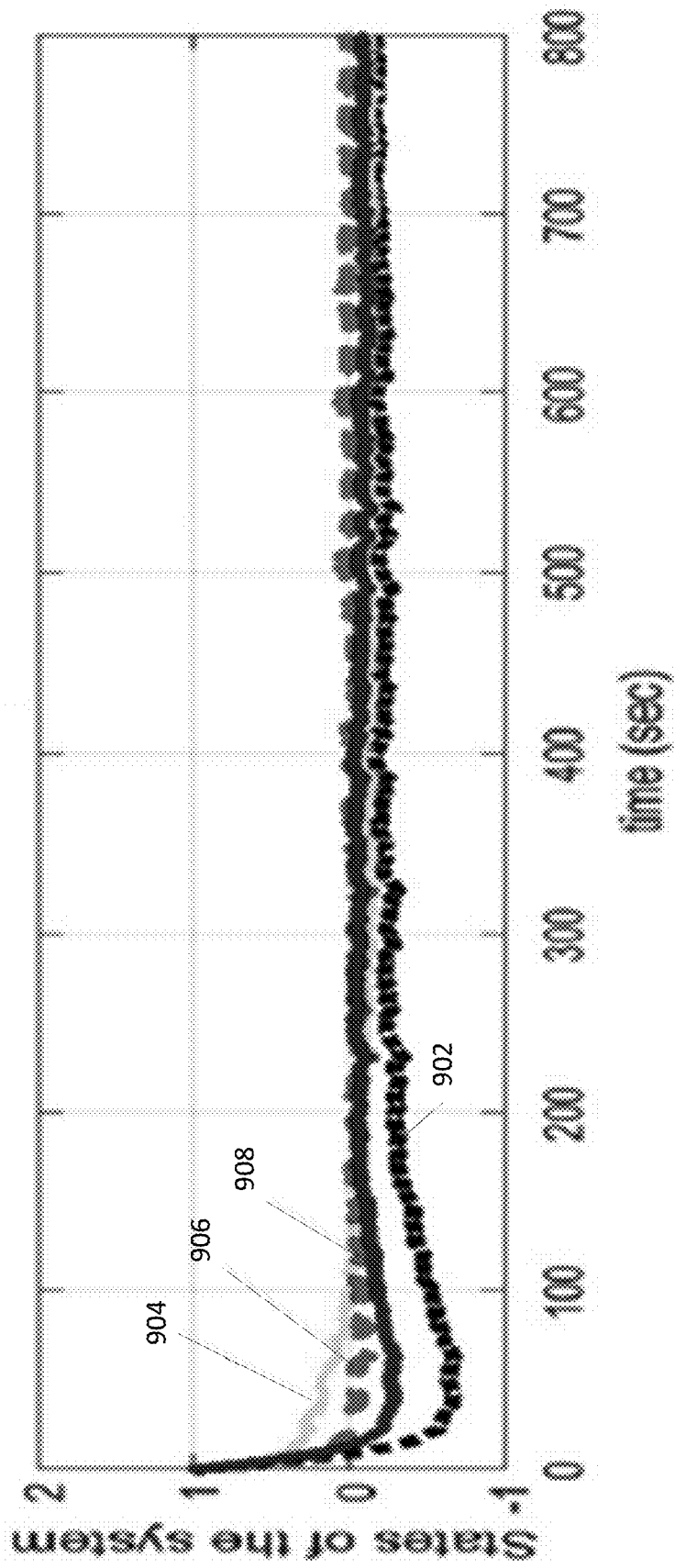
Figure 10A:
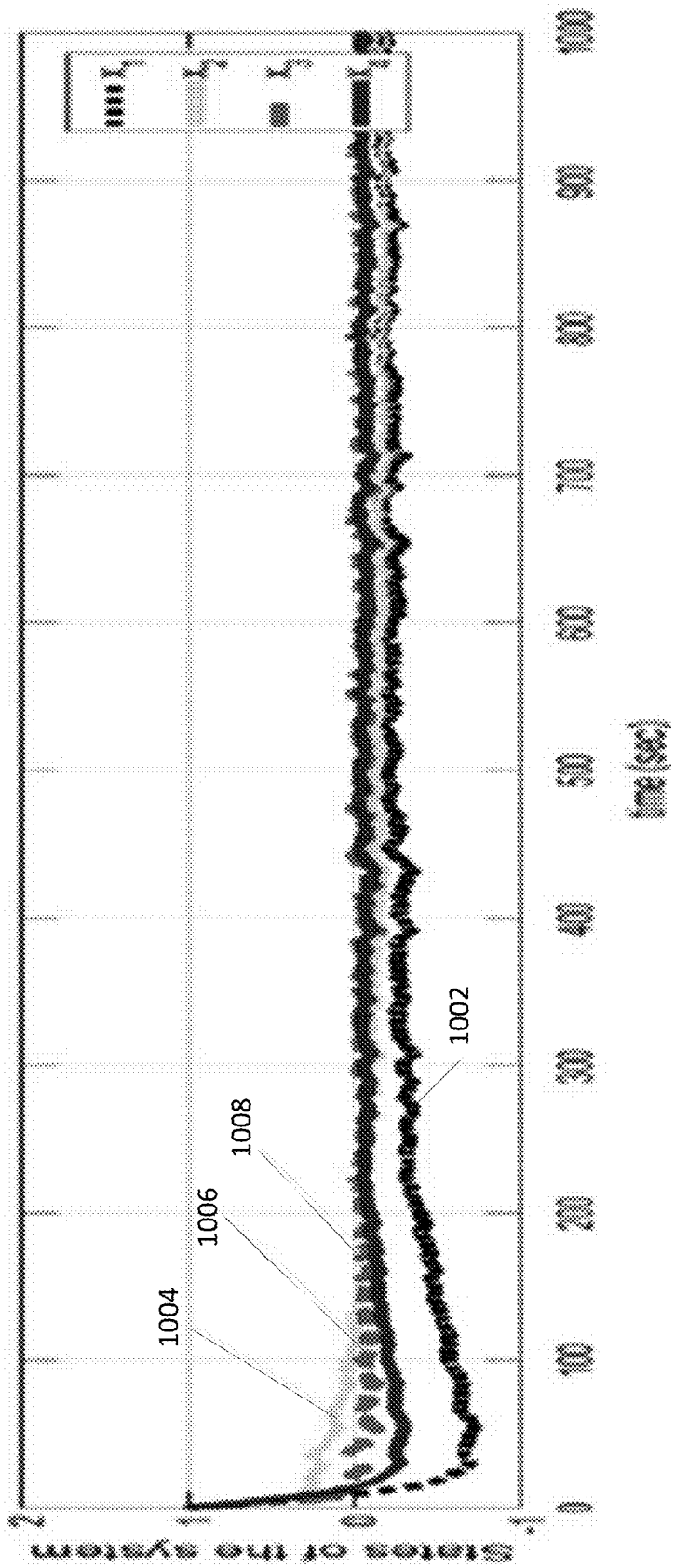
FIGS. 10A-10C are graphs illustrating the states of the system under hybrid DDoS and deception attacks.
Figure 10B:
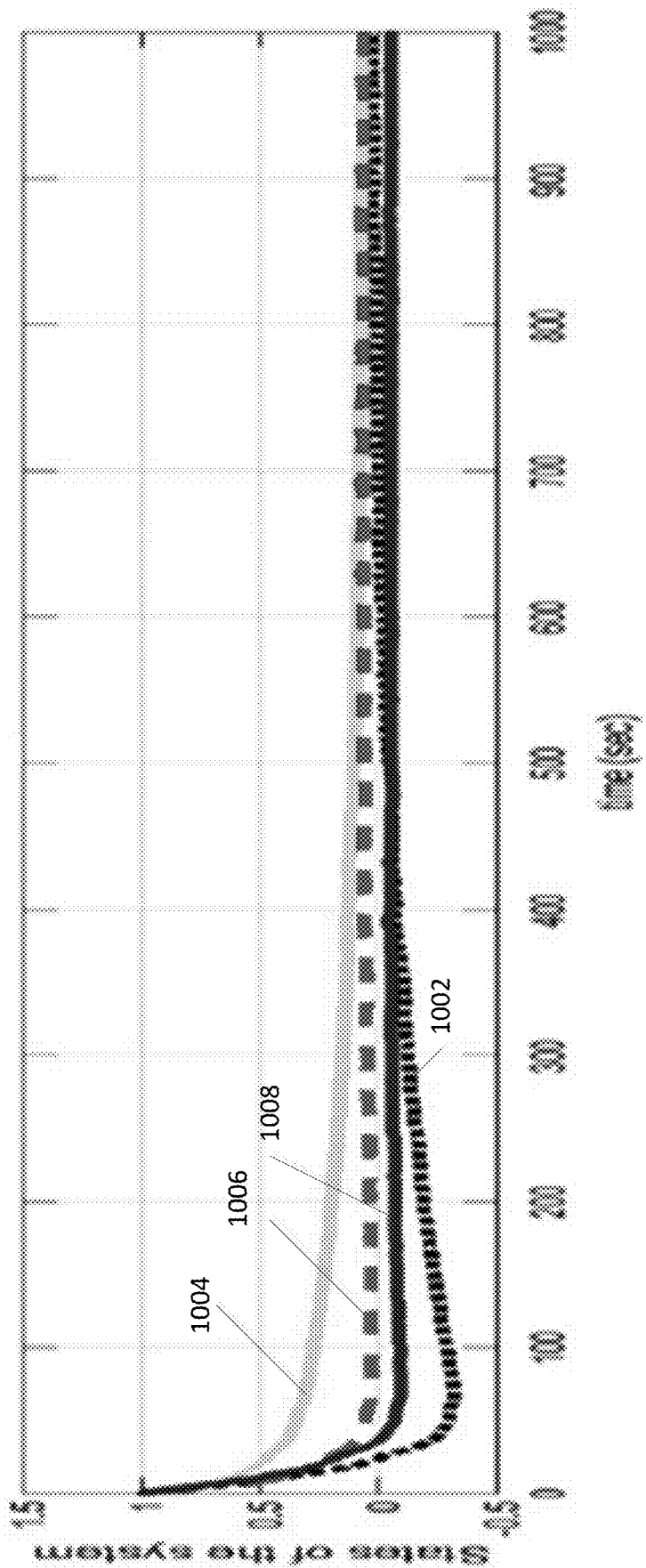
Figure 10C:
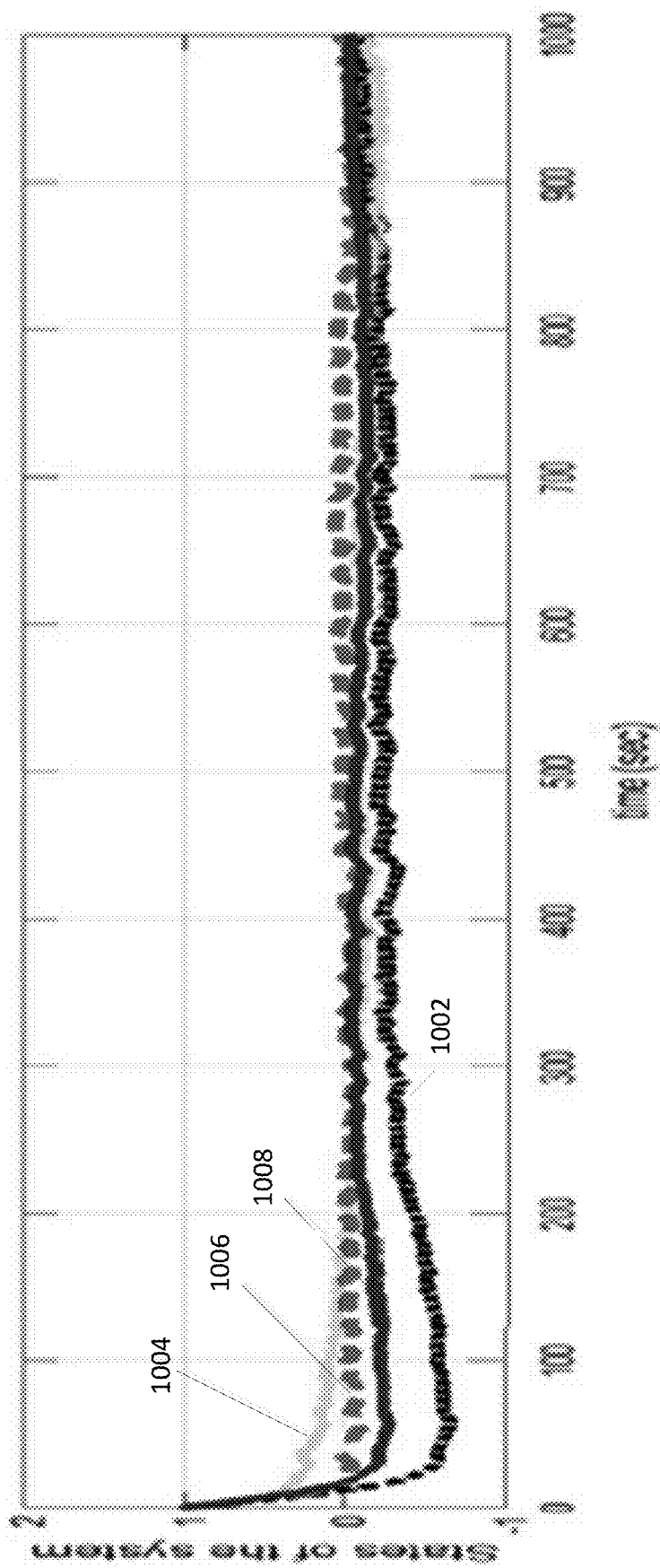

The CPS model has been created via Matlab/Simulink. The attacks affect the CPS at nodes A1 602 and A2 622. The hybrid attacks resemble the occurrence of false data injection and delayed data simultaneously following the above models. The attacks were generated and injected to the CPS by modeling their effects using Bernoulli distributed white sequences $\alpha_1(k), \alpha_2(k), \beta_1(k), \beta_2(k)$, with probabilities as described in Section 2 and $\tau_f^{min}=10$ s, $\tau_f^{max}=30$ s, $\tau_b^{min}=20$ s, $\tau_b^{max}=80$ s. Several scenarios have been considered to present possible and worst situations in the system, then obtain the values of states in each scenario. Variables x1, x2, x3, x4 each represents one state variable, in the four-tank system, where each x represents the difference between the level in the respective tank and the equilibrium point. The figures show that this difference goes to zero which means the level of water reaches the desired value using MATLAB/Simulink such as:

(1) The system free of attacks is shown FIG. 7.
(2) The system affected by DDoS attacks is shown FIGS. 8A-8C. FIGS. 8A-8C are graphs illustrating the states of the system under DDoS attack on: (FIG. 8A) the forward direction, (FIG. 8B) the backward direction, and (FIG. 8C) on both directions.
(3) The system affected by deception attacks is shown FIGS. 9A-9C. FIGS. 9A-9C are graphs illustrating the states of the system under deception attacks: (FIG. 9A) the forward direction, (FIG. 9B) the backward direction, and (FIG. 9C) on both directions
(4) The system affected by simultaneous DDoS and deception attacks is shown FIGS. 10A-10C. FIGS. 10A-10C are graphs illustrating the states of the system under hybrid DDoS and deception attacks: (FIG. 10A) the forward direction, (FIG. 10B) the backward direction, and (FIG. 10C) on both directions As shown in FIGS. 7 to 10, the designed control scheme maintains the stability in all states in all scenarios.

As shown in this example, the disclosed method depends on a previous stage that detects the type of attack. Once the type of attacks is identified, the disclosed configuration is invoked in very short time and starts controlling the behavior of the CPS. The system parameters are computed offline. Hence, once there is a triggered attack, the designed observer/controller is invoked immediately with no further delay. Therefore, the disclosed control system is practical. As demonstrated in FIGS. 8 to 10 (FIGS. 5-7), it took only seconds for the systems to get back to its stable condition as before the attack.

4.2. Example 2: A Single Machine Connected to an Infinite-Bus

In this practical example, an Automatic Voltage Regulator (AVR) and a fast static exciter are mounted on the generator. The fourth order linearized model is applied to represent the dynamics of the system in the following state space model:

$$\dot{x}(t) = Ax(t) + Bu(t),\ y = Cx(t) \quad (25)$$

with $$x = [\Delta\delta\ \Delta\omega\ \Delta E_q'\ \Delta E_{fd}]' \quad (26)$$

$$A = \begin{bmatrix} 0 & \omega_0 & 0 & 0 \\ \frac{-k_1}{M} & 0 & \frac{-k_2}{M} & 0 \\ \frac{-k_4}{TT_{do}} & 0 & \frac{-1}{T} & \frac{-1}{T_{do}} \\ \frac{-k_5 k_E}{T_E} & 0 & \frac{-k_6 k_E}{T_E} & \frac{-1}{T_E} \end{bmatrix},$$

$$B = \begin{bmatrix} 0 & 0 & 0 & \frac{k_E}{T_E} \end{bmatrix}',\ C = [0\ 1\ 0\ 0]' \quad (27)$$

See Soliman H M, Soliman M. Design of observer-based robust power system stabilizers. Int J Electr Comput Eng 2016;6(5):2088-8708, incorporated herein by reference in its entirety.

The symbols above have their usual meaning. See Soliman et al. Different power system stabilizer (PSS) inputs can be applied such as accelerating power, bus frequency, or machine shaft speed. A matrix C is selected as shown since the speed variation Δω is the most commonly used in practice.

The parameter matrices of the corresponding model are as follows:

$$A = \begin{bmatrix} 0 & 314 & 0 & 0 \\ -0.1186 & 0 & -0.0906 & 0 \\ -0.1934 & 0 & -0.4633 & 0.1667 \\ -11.864 & 0 & -511.6 & -20 \end{bmatrix}, \quad (28)$$

$$B = [0\ 0\ 0\ 1000]', C = [0\ 1\ 0\ 0]'$$

Figure 11:
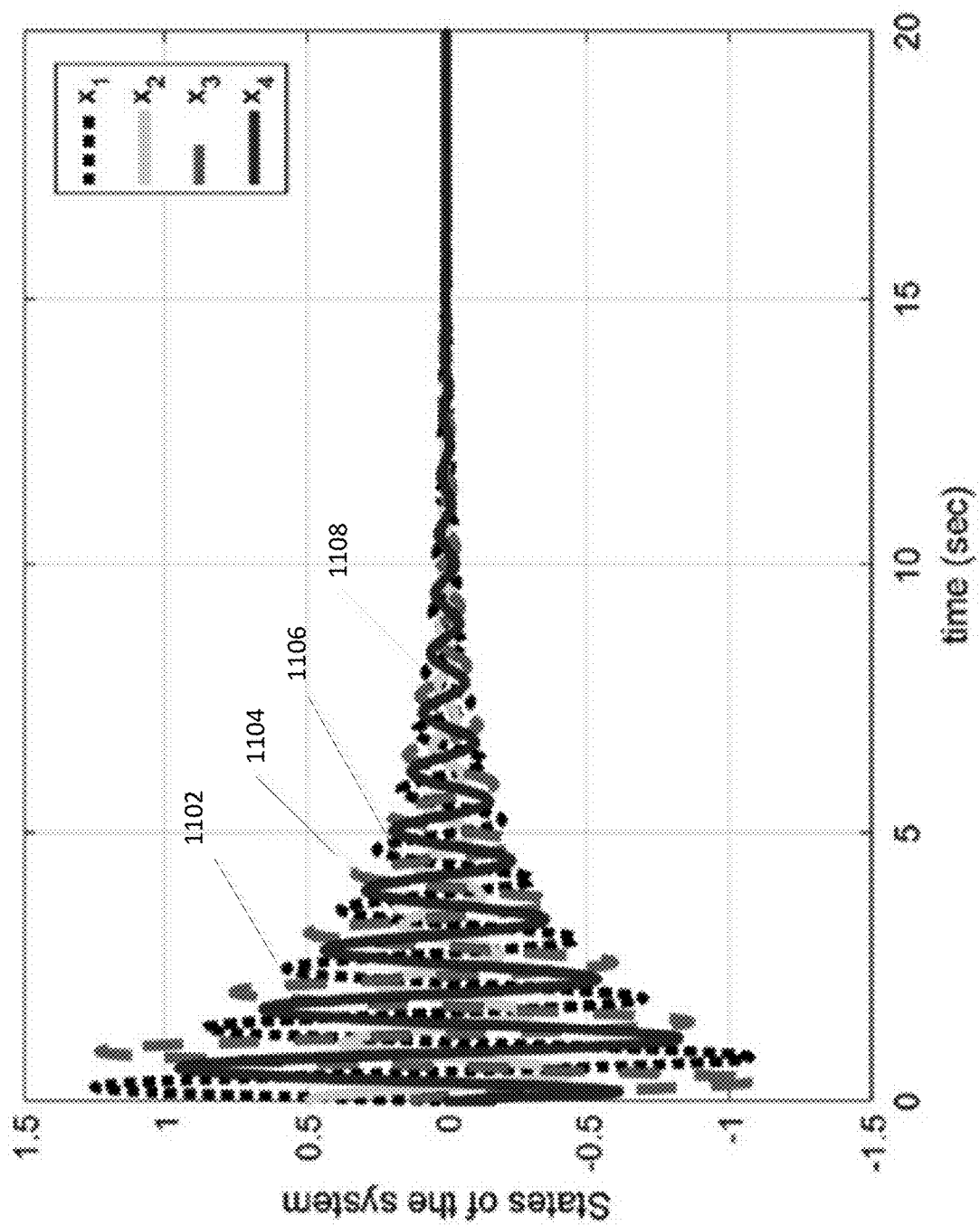
FIG. 11 is a graph illustrating the system free of attacks.
Figure 12A:
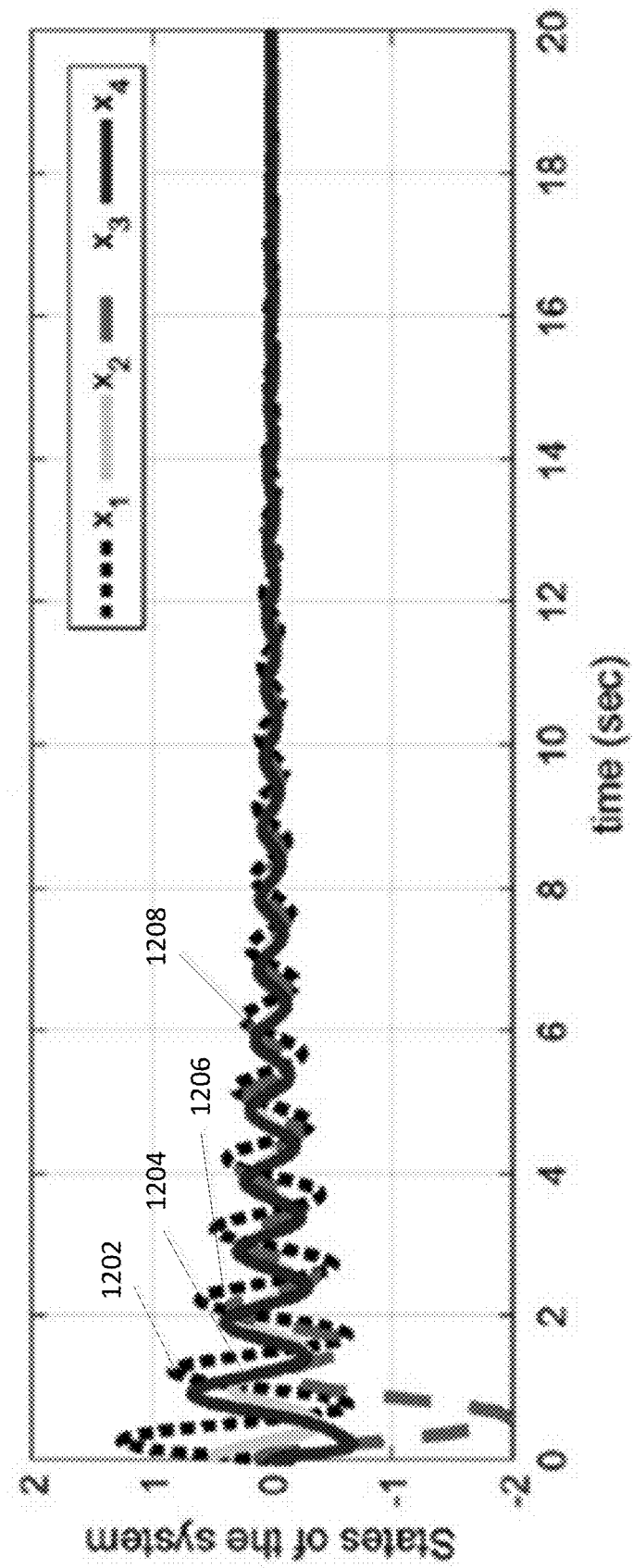
FIGS. 12A-12C are graphs illustrating the states of the system under DDoS attack.
Figure 12B:
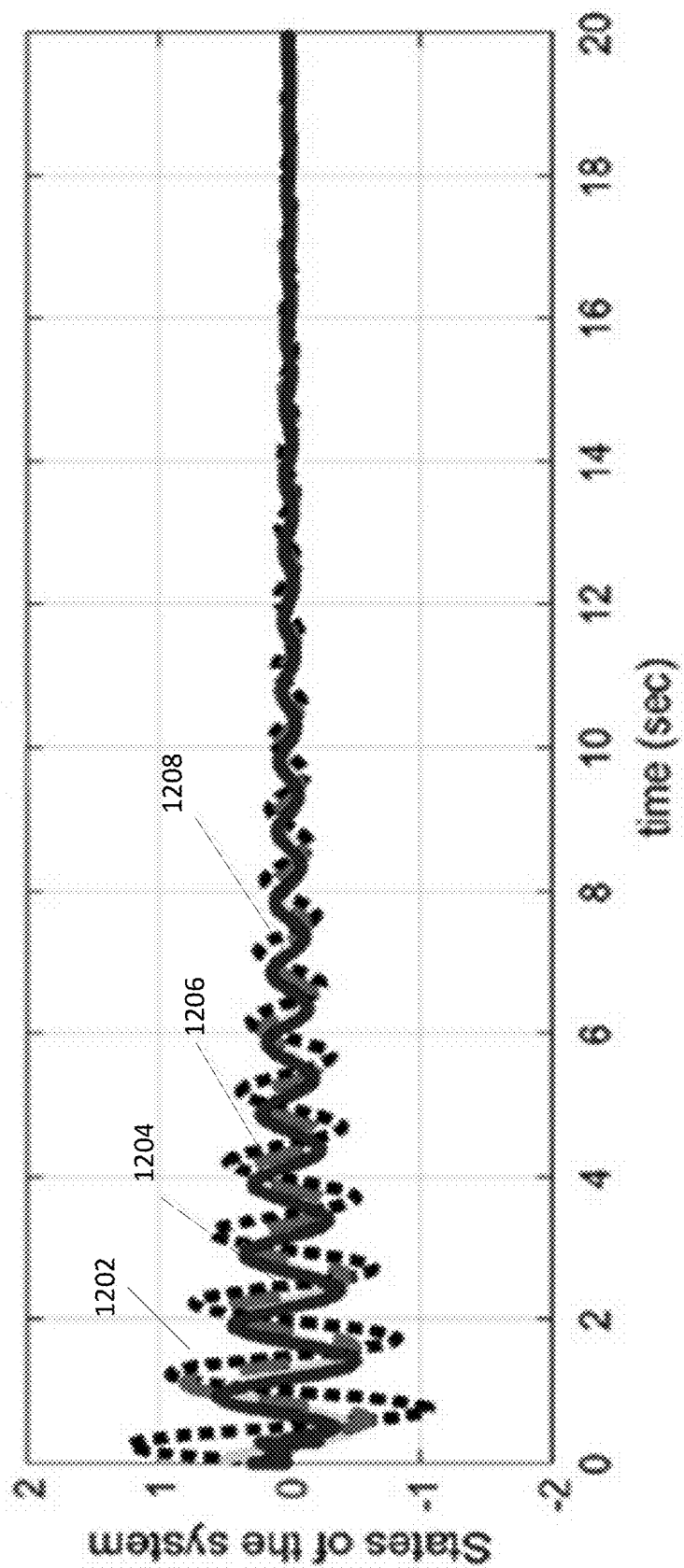
Figure 12C:
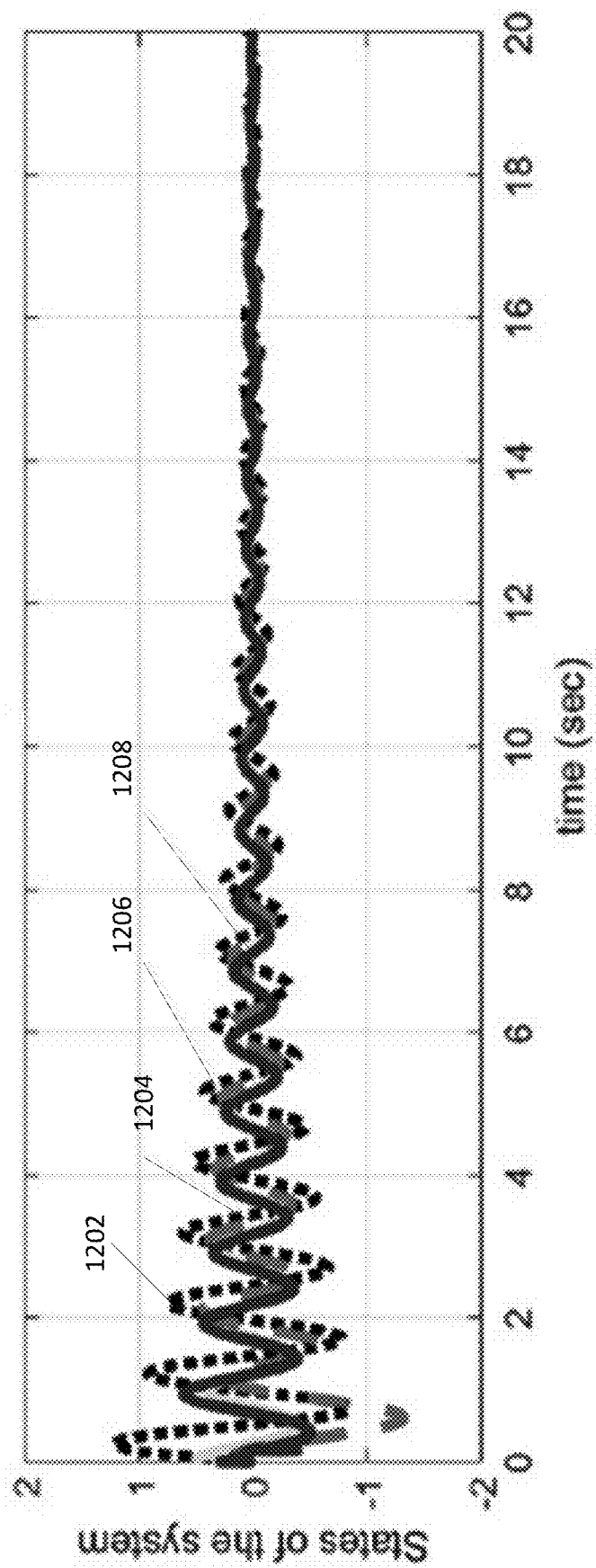
Figure 13A:
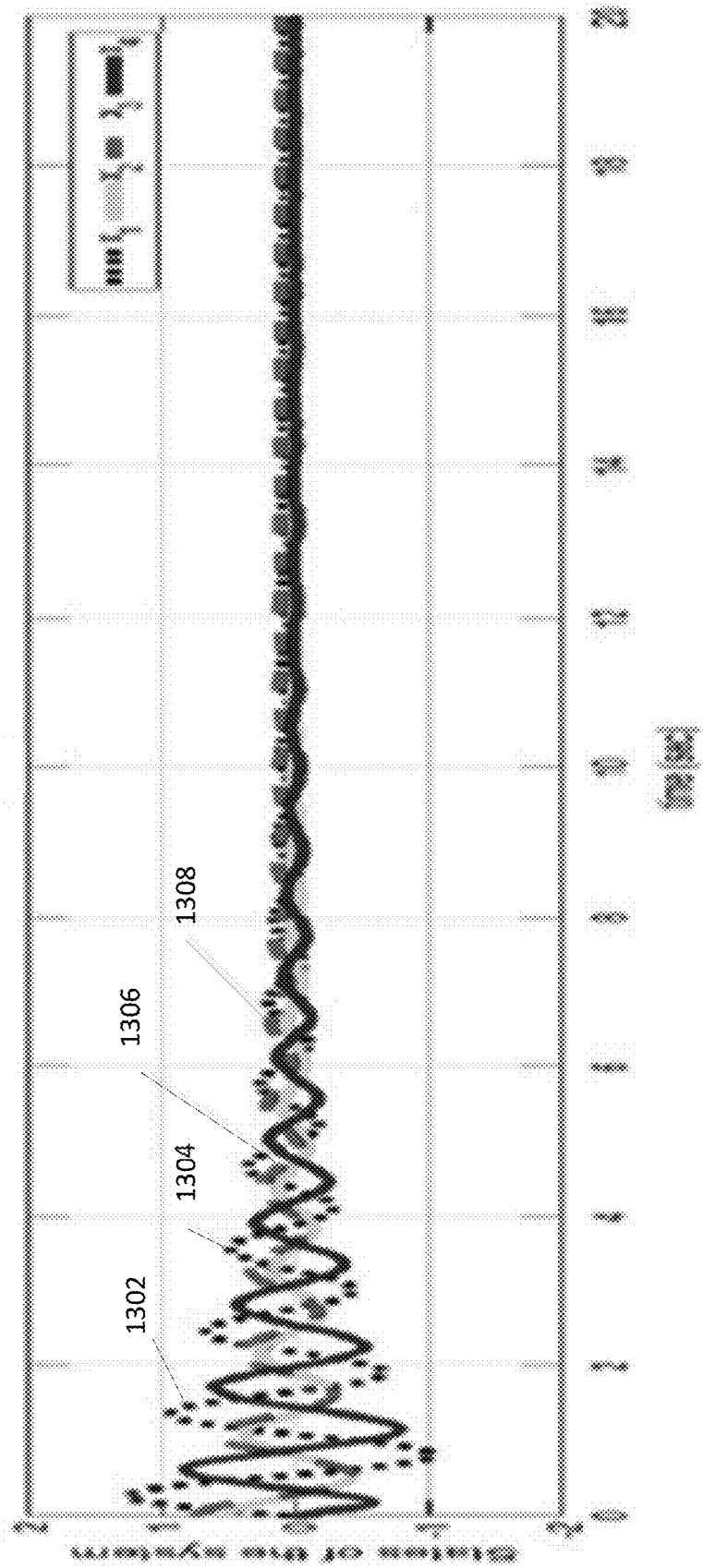
FIGS. 13A-13C are graphs illustrating the states of the system under deception attacks.
Figure 13B:
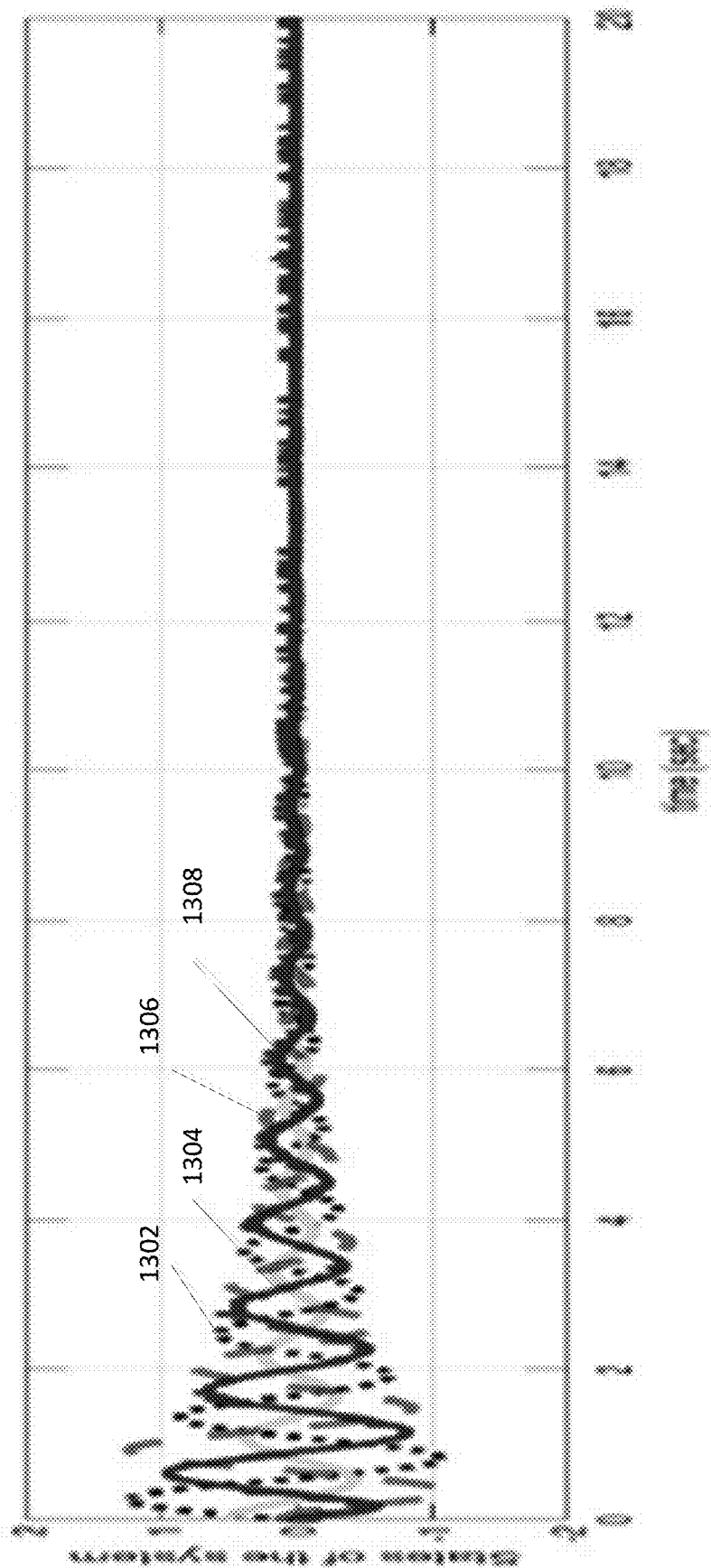
Figure 13C:
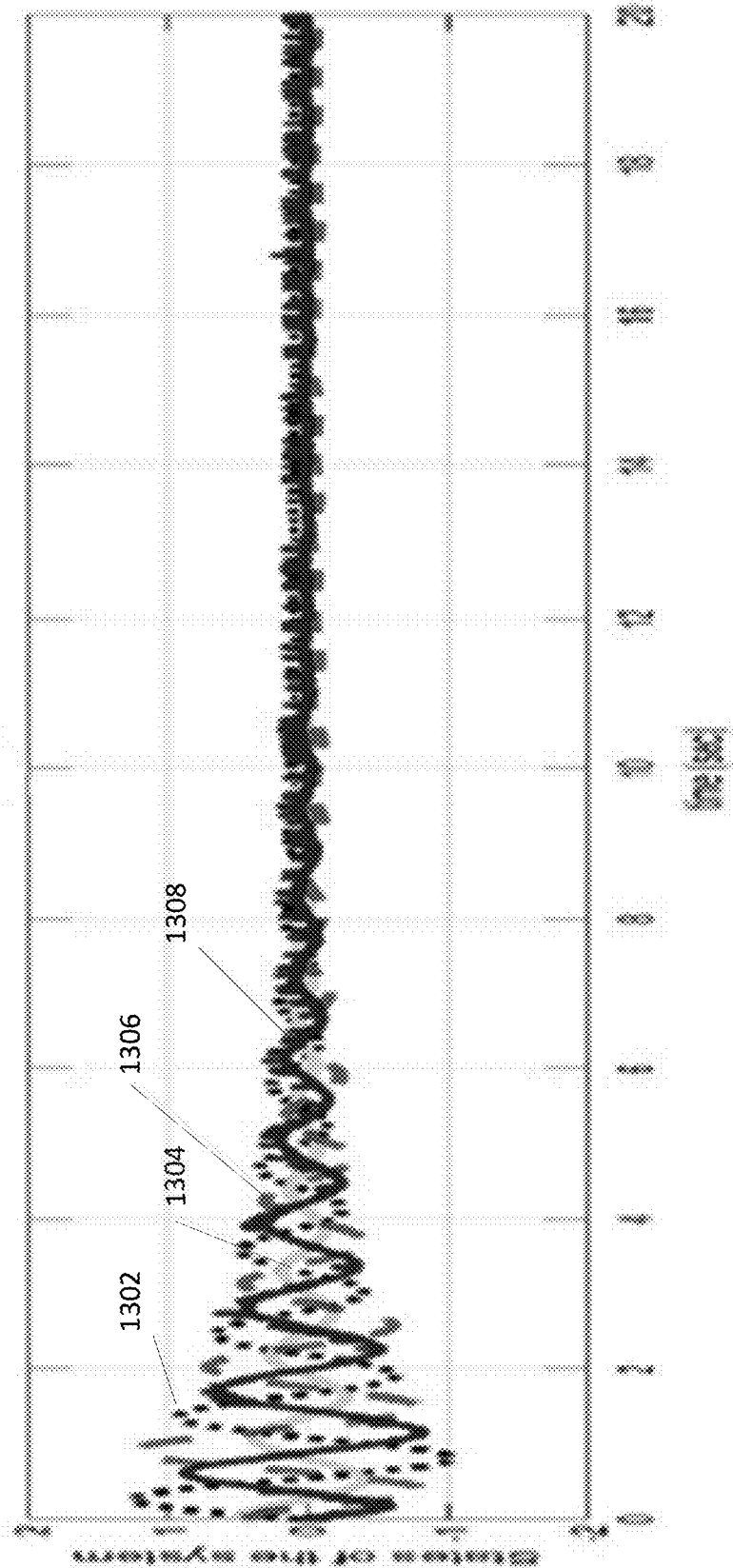
Figure 14A:
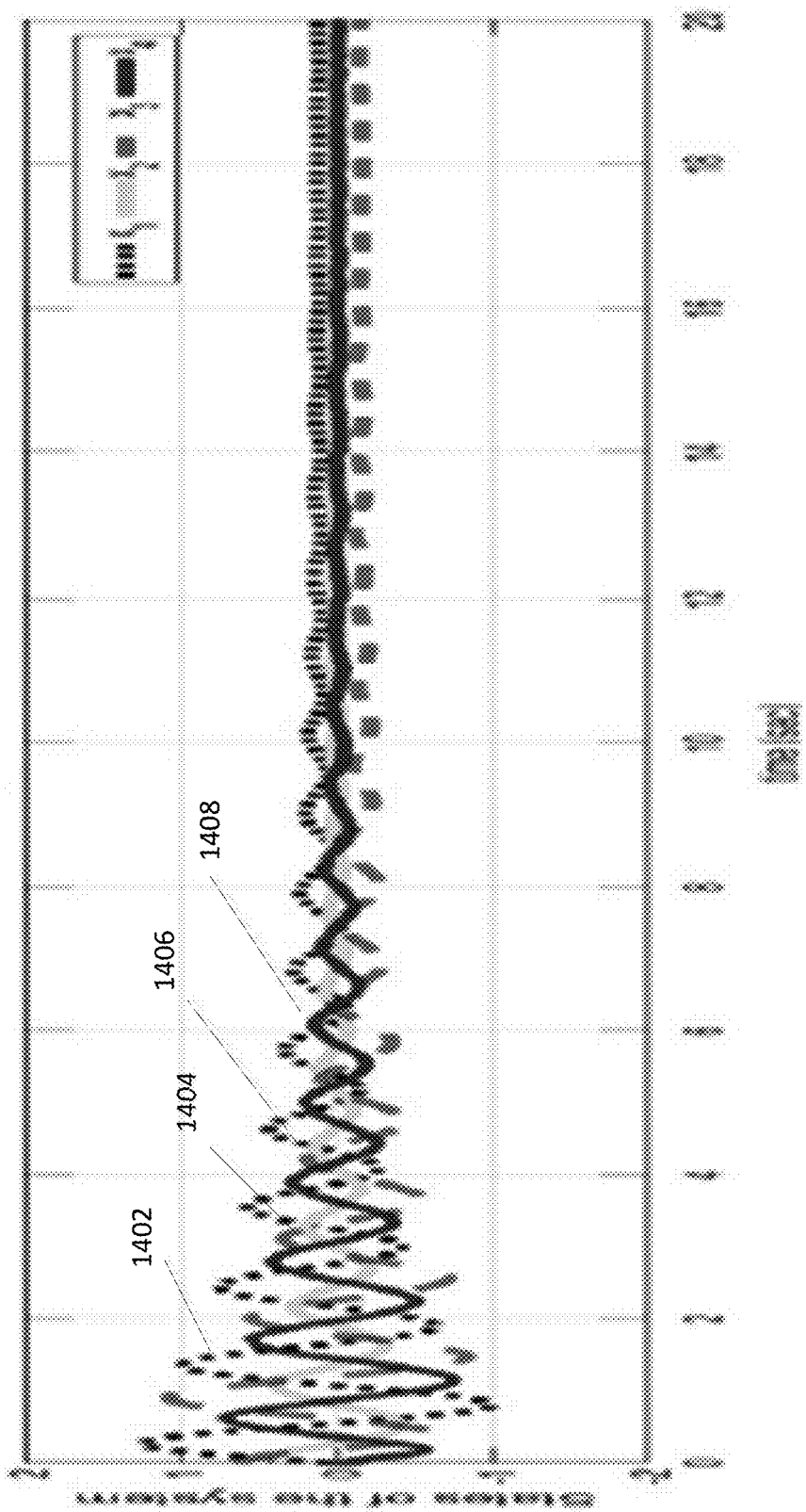
FIGS. 14A-14C are graphs illustrating the states of the system under hybrid DDoS and deception attacks.
Figure 14B:
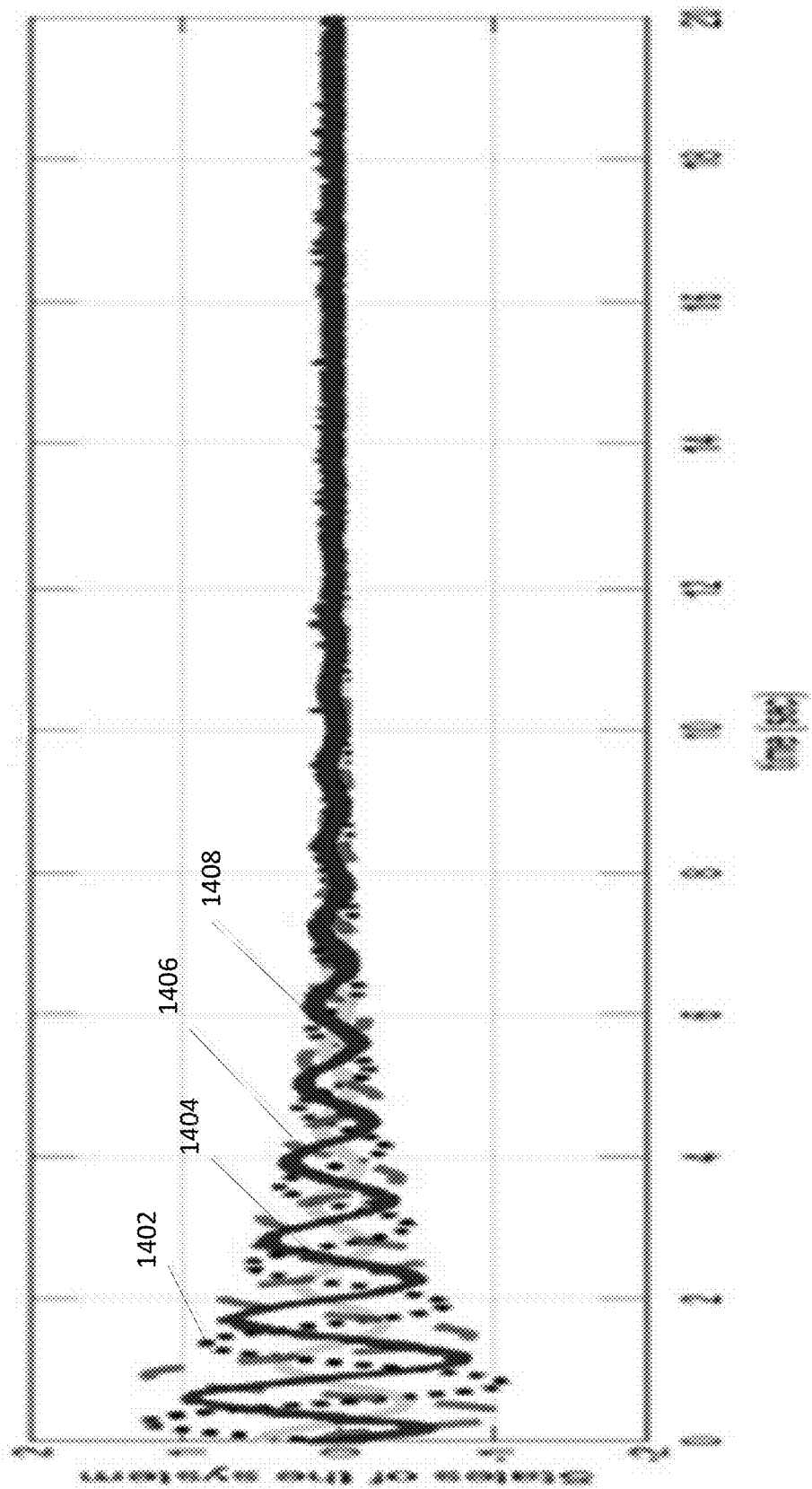
Figure 14C:
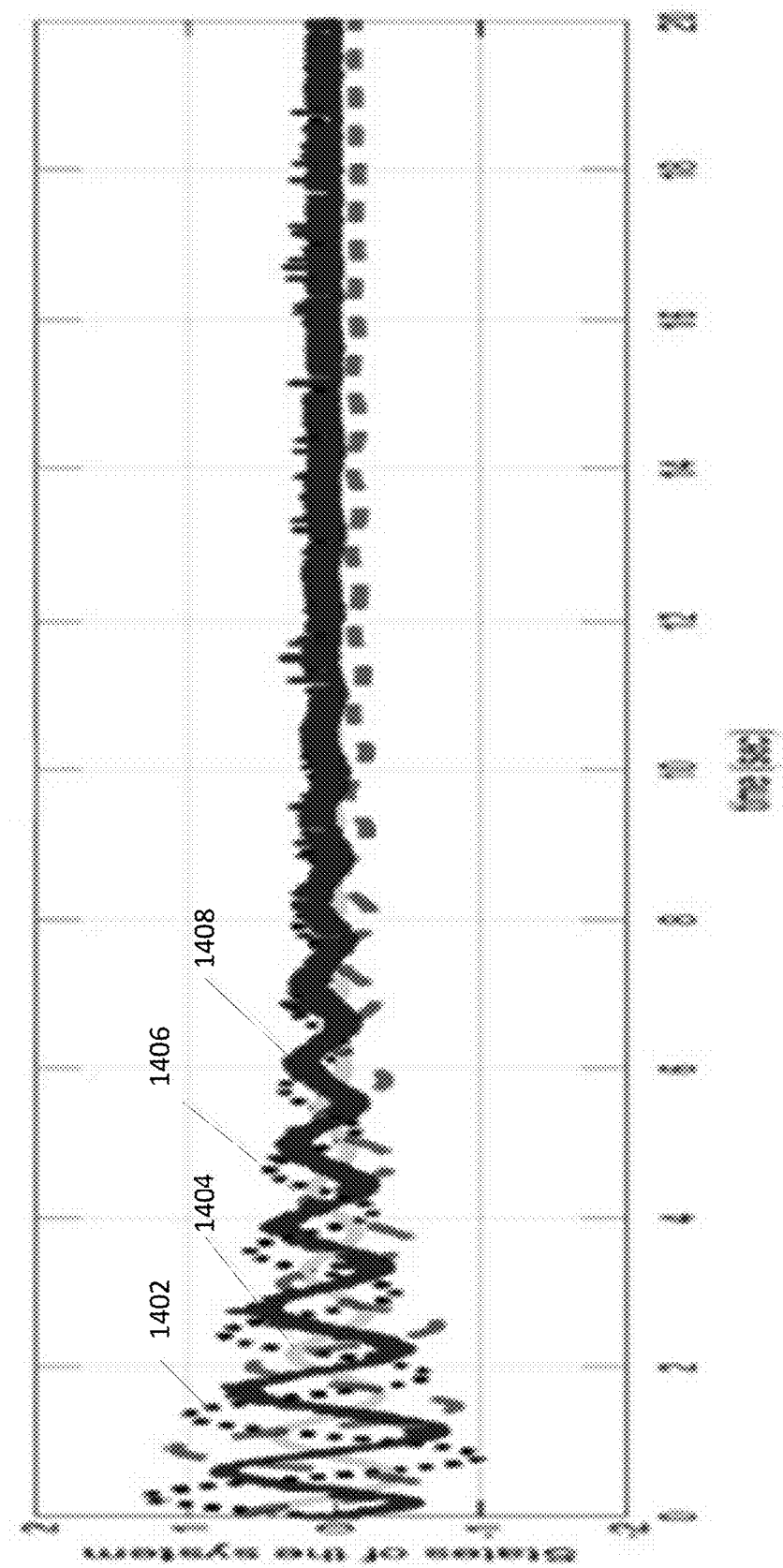

The CPS model has been created via Matlab/Simulink. Several scenarios have been considered to present possible and worst situations in the system, then obtain the values of states in each scenario using MATLAB/Simulink such as:

(1) The system free of attacks is shown FIG. 11.
(2) The system affected by DDoS attacks is shown FIGS. 12A-12C. FIGS. 12A-12C are graphs illustrating the states of the system under DDoS attack on: (FIG. 12A) the forward channel, (FIG. 12B) the backward channel, and (FIG. 12C) on both channels.
(3) The system affected by deception attacks is shown FIGS. 13A-13C. FIGS. 13A-13C are graphs illustrating the states of the system under deception attacks: (FIG. 13A) the forward channel, (FIG. 13B) the backward channel, and (FIG. 13C) on both channels.
(4) The system affected by simultaneous DDoS and deception attacks is shown FIGS. 14A-14C. FIGS. 14A-14C are graphs illustrating the states of the system under hybrid DDoS and deception attacks: (FIG. 14A) the forward channel, (FIG. 14B) the backward channel, and (FIG. 14C) on both channels.

As shown in FIGS. 11 to 14, the designed control scheme maintains the stability in all states in all scenarios.

Figure 15:
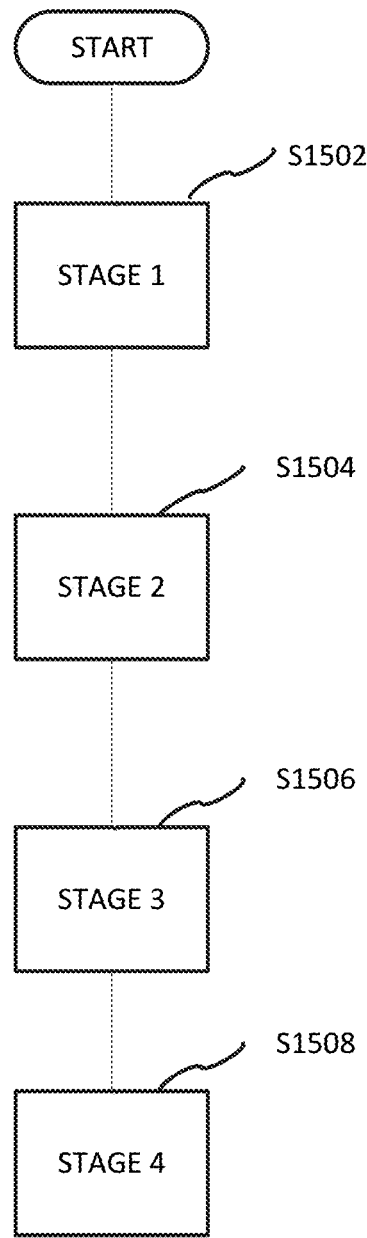
FIG. 15 is a flowchart for an exemplary process scenario.

FIG. 15 is a flowchart for an exemplary process scenario. The flowchart is an example of how the observer-based controller will be changed during the system's operation. Although the flowchart shows a sequence of steps, the order of the steps is not limited to those shown in FIG. 15. Also, any number of steps may be encountered in exemplary scenarios. Referring to Example 1 (FIG. 6), in the quadruple-tank CPS, K and L are predetermined before the operation of the controller, as in equation (24).

During operation, the values of the designed parameters (K and L) of the observer-based controller remain constant, as well as the system parameters (A, B, and C). The changes occur in the signals transmitted through the network, leading to the change to the overall system equation (9).

In stage 1 (S1502), no attack is occurring in the CPS (Case 1 in Table 1), such that $\alpha_1=0, \alpha_2=0, \beta_1=0, \beta_2=0,$ Equation (9) becomes as follows:

$$\xi(k+1) = \begin{bmatrix} A-BK & -BK \\ 0 & A-LC \end{bmatrix} \xi(k) + \begin{bmatrix} 0 & 0 \\ -L & 0 \end{bmatrix} \overline{e}(k),$$

In stage 2 (S1504), deception attacks occur in both forward and backward paths (Case 4 in Table 1), such that $\alpha_1=0, \alpha_2=0, \beta_1=1, \beta_2=0,$ Equation (9) becomes as follows:

$$\xi(k+1) = \begin{bmatrix} A & 0 \\ -BK & A+BK-LC \end{bmatrix} \xi(k) + \begin{bmatrix} B & 0 \\ B & 0 \end{bmatrix} \zeta(k-\tau) + \begin{bmatrix} 0 & 0 \\ -L & 0 \end{bmatrix} \overline{e}(k),$$

In stage 3 (S1506), DDoS attacks occur in both paths (Case 13 in Table 1), such that $\alpha_1=1, \alpha_2=1, \beta_1=0, \beta_2=0,$ Equation (9) becomes as follows:

$$\xi(k+1) = \begin{bmatrix} A+BK & -BK \\ LC & A-LC \end{bmatrix} \xi(k) + \begin{bmatrix} 0 & 0 \\ -LC & 0 \end{bmatrix} \xi(k-\tau_k^f) + \begin{bmatrix} 0 & 0 \\ 0 & -L \end{bmatrix} \overline{e}(k),$$

In stage 4 (S1508), both DDoS and deception attacks occur in all paths simultaneously (Case 16 in Table 1), such that $\alpha_1=1, \alpha_2=1, \beta_1=1, \beta_2=1,$ Equation (9) becomes as follows:

$$\xi(k+1) = \begin{bmatrix} A & 0 \\ -BK+LC & A+BK-LC \end{bmatrix} \xi(k) + \begin{bmatrix} B & 0 \\ B & -L \end{bmatrix} \zeta(k-\tau)$$

Industry Revolution 4.0 pushes the industry to digitize all its operations. Examples of Cyberphysical Systems (CPSs) include autonomous automobile systems and medical monitoring. However, because these systems are interconnected via the Internet, they become more vulnerable to cyberattacks and in particular, stealthy attacks. Cyber attacks could affect the operations of CPS and cause physical damages before any indication. So, there is a need to design a secure control system to withstand inequalities. Two illustrative examples are presented and discussed to show the effectiveness of the presented scheme in these circumstances. An event-triggering control scheme is disclosed for discrete time CPSs contain random measurements and actuation delays and subject to simultaneous hybrid distributed denial of service (DDoS) and deception attacks. The cyber attacks are designed as Bernoulli distributed white sequences with conditional probabilities that are variable. Moreover, an event-triggered scheme is proposed to decrease the communication in the system, where the measurement's signal is sent when a certain triggering condition is met. Linear matrix inequalities are used to represent the overall control scheme.

Numerous modifications and variations of the present invention are possible in light of the above teachings. It is therefore to be understood that within the scope of the appended claims, the invention may be practiced otherwise than as specifically described herein.

The invention claimed is:

1. A programmable logic controller to securely control a cyberphysical system, the observer-based controller comprising:
  a detector to determine an occurrence of an attack on the cyberphysical system and to inform the observer-based controller via a signal, wherein the detector is at least one of a communication detector, a control signal detector, and a fluid level detector; and
  an observer to estimate a system state of the cyberphysical system based on at least partial information about the cyber physical system,
  wherein the observer-based controller is configured with a predetermined observer gain L and controller gain K, wherein the observer-based controller is configured to control the cyberphysical system using an estimated error determination that is altered depending on a type of cyber attack, wherein the observer-based controller is configured to control the cyberphysical system subjected to cyber attacks in both a forward channel connecting at least one sensor with the observer and a backward channel connecting the observer-based controller with actuators, wherein the estimated error determination is altered from $$\xi(k+1) = \begin{bmatrix} A-BK & -BK \\ 0 & A-LC \end{bmatrix}\xi(k) + \begin{bmatrix} 0 & 0 \\ -L & 0 \end{bmatrix}\overline{e}(k)$$

to $$\xi(k+1) = \begin{bmatrix} A & 0 \\ -BK & A+BK-LC \end{bmatrix}\xi(k) + \begin{bmatrix} B & 0 \\ B & 0 \end{bmatrix}\zeta(k-\tau) + \begin{bmatrix} 0 & 0 \\ -L & 0 \end{bmatrix}\overline{e}(k)$$

when the cyberphysical system moves from a state of no attacks to a state of undergoing a deception attack in both the forward channel and the backward channel, and wherein A, B, and C are matrices for the cyberphysical system.

2. The programmable logic controller of claim 1, further comprising:
the at least one sensor measuring the system state of the cyberphysical system; and
an event triggering mechanism that transmits the measurement by the at least one sensor when a condition is met, the condition includes when a difference in transmitted signal in a previous event instant and a current output signal is greater than a predetermined triggering condition,
wherein the observer observes the state of the cyberphysical system based on the transmitted sensor measurement.

3. The programmable logic controller of claim 2, wherein the observer-based controller is configured to control the cyberphysical system while the attack is a DDoS that delays the sensor measurement or an actuator control signal or both in accordance with a variable probability.

4. The programmable logic controller of claim 1, wherein the observer-based controller is configured to control the cyberphysical system such that signals to actuators take into account manipulations and delays due to the cyber attack.

5. The programmable logic controller of claim 2, wherein the observer-based controller is configured to control the cyberphysical system subjected to a DDoS attack that causes a delay in a forward signal through the forward channel connecting the at least one sensor with the observer while a deception attack modifies the forward signal.

6. The programmable logic controller of claim 1, wherein the observer-based controller is configured to control the cyber physical system while a DDoS attack causes a delay in the cyberphysical system and a deception attack occurs during the delay.

7. A method to control a cyber physical system, the method comprising:
detecting, via a detector, an occurrence of an attack on and to inform an observer-based controller via a signal, wherein the detector is at least one of a communication detector, a control signal detector, and a fluid level detector;
estimating, via an observer, a system state of the cyberphysical system based on at least partial information about the cyber physical system,
wherein the observer-based controller is configured with a predetermined observer gain L and a controller gain K, and
controlling, using the observer-based controller, the cyberphysical system using an estimated error determination that is altered depending on a type of cyber attack,
wherein the cyberphysical system is controlled while being subjected to cyber attacks in both a forward channel connecting a at least one sensor with the observer and a backward channel connecting the controller with actuators,
altering the estimated error determination from $$\xi(k+1) = \begin{bmatrix} A-BK & -BK \\ 0 & A-LC \end{bmatrix}\xi(k) + \begin{bmatrix} 0 & 0 \\ -L & 0 \end{bmatrix}\overline{e}(k)$$

to $$\xi(k+1) = \begin{bmatrix} A & 0 \\ -BK & A+BK-LC \end{bmatrix}\xi(k) + \begin{bmatrix} B & 0 \\ B & 0 \end{bmatrix}\zeta(k-\tau) + \begin{bmatrix} 0 & 0 \\ -L & 0 \end{bmatrix}\overline{e}(k)$$

when the system moves from a state of no attacks to a state of undergoing a deception attack in both the forward channel and the backward channel, and
wherein A, B, and C are matrices for the cyberphysical system.

8. The method of claim 7, further comprising:
measuring, via the at least one sensor, the system state of the cyberphysical system; and
transmitting, via an event triggering mechanism, the measurement by the at least one sensor when a condition is met, the condition includes when a difference in transmitted signal in a previous event instant and a current output signal is greater than a predetermined triggering condition,
wherein the observer observes the state of the cyberphysical system based on the transmitted sensor measurement.

9. The method of claim 8, further comprising:
controlling, using the observer-based controller, the cyberphysical system while the attack is a DDoS that delays the sensor measurement or an actuator control signal or both in accordance with a variable probability.

10. The method of claim 7, further comprising:
controlling, using the observer-based controller, the cyberphysical system such that signals to actuators take into account manipulations and delays due to the cyber attack.

11. The method of claim 7, further comprising:
controlling, using the observer-based controller, the cyberphysical system subjected to a DDoS attack that causes a delay in a forward signal through the forward channel connecting the at least one sensor with the observer while a deception attack modifies the forward signal.

* * * * *